(12) United States Patent
Petersen

(10) Patent No.: US 7,733,781 B2
(45) Date of Patent: Jun. 8, 2010

(54) DISTRIBUTED CONGESTION AVOIDANCE IN A NETWORK SWITCHING SYSTEM

(75) Inventor: Brian A. Petersen, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 585 days.

(21) Appl. No.: 11/639,651

(22) Filed: Dec. 15, 2006

(65) Prior Publication Data

US 2007/0248009 A1 Oct. 25, 2007

Related U.S. Application Data

(60) Provisional application No. 60/794,385, filed on Apr. 24, 2006.

(51) Int. Cl.
H04L 12/26 (2006.01)

(52) U.S. Cl. .................. 370/235; 370/230; 370/252

(58) Field of Classification Search ............. 370/230, 370/230.1, 231, 232, 233, 234, 235, 236, 370/237

See application file for complete search history.

(56) References Cited

U.S. PATENT DOCUMENTS

| | | | |
|---|---|---|---|
| 5,132,965 A | 7/1992 | Zhang | |
| 5,802,052 A | 9/1998 | Venkataraman | |
| 6,173,384 B1 | 1/2001 | Weaver | |
| 6,333,932 B1 | 12/2001 | Kobayasi et al. | |
| 6,956,858 B2 | 10/2005 | Hariguchi et al. | |
| 7,212,528 B2 | 5/2007 | Kuhl et al | |
| 7,274,697 B2 | 9/2007 | Ji et al. | |
| 7,362,702 B2 * | 4/2008 | Terrell et al. | 370/230 |
| 2002/0141397 A1 * | 10/2002 | Piekarski et al. | 370/360 |
| 2003/0058880 A1 * | 3/2003 | Sarkinen et al. | 370/413 |
| 2003/0118052 A1 | 6/2003 | Kuhl et al. | |
| 2004/0004961 A1 * | 1/2004 | Lakshmanamurthy et al. | 370/364 |
| 2004/0090974 A1 * | 5/2004 | Balakrishnan et al. | 370/412 |
| 2005/0073956 A1 * | 4/2005 | Moores et al. | 370/235 |
| 2005/0094643 A1 * | 5/2005 | Wang et al. | 370/395.4 |
| 2005/0190758 A1 | 9/2005 | Gai et al. | |
| 2005/0190795 A1 * | 9/2005 | Abel et al. | 370/498 |
| 2005/0254493 A1 | 11/2005 | Chang et al. | |
| 2006/0165071 A1 * | 7/2006 | Van Wageningen et al. | 370/380 |
| 2007/0121499 A1 * | 5/2007 | Pal et al. | 370/230 |
| 2007/0248086 A1 | 10/2007 | Petersen | |
| 2007/0268825 A1 * | 11/2007 | Corwin et al. | 370/230 |
| 2009/0252038 A1 * | 10/2009 | Cafiero et al. | 370/235 |

OTHER PUBLICATIONS

White Paper, A Scalable Approach to Gigabit Ethernet Switch Design, 28 pgs.
Pappu, Prashanth "Distributed Queueing in Scalable high Performance Routers", IEEE Infocom, 2003, 10 pages.

* cited by examiner

*Primary Examiner*—Chi H. Pham
*Assistant Examiner*—Kevin Mew
(74) *Attorney, Agent, or Firm*—Brake Hughes Bellermann LLP

(57) ABSTRACT

According to an example embodiment, a total offered traffic load for a shared resource within a network switching system may be determined, the total offered traffic load may include, for example, a sum of offered traffic loads from one or more active virtual output queues (VOQs) of the network switching system. A capacity of the shared resource within the network switching system may be determined. A transmission rate from one or more of the active VOQs over the shared resource may be adjusted such that the total traffic load from the active VOQs does not exceed the capacity of the shared resource.

21 Claims, 10 Drawing Sheets

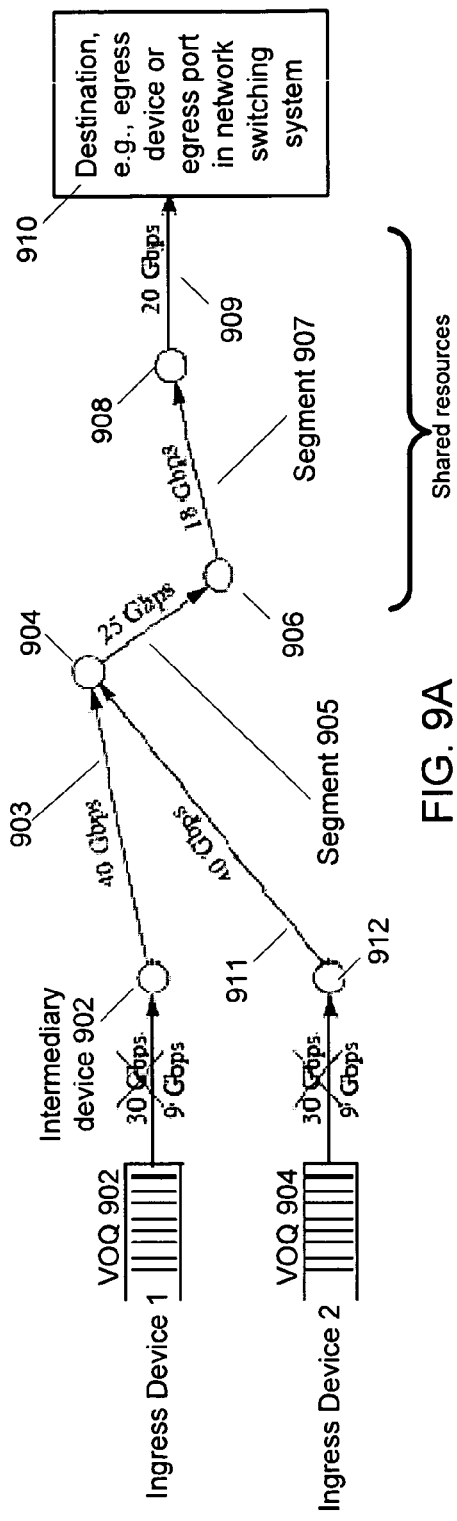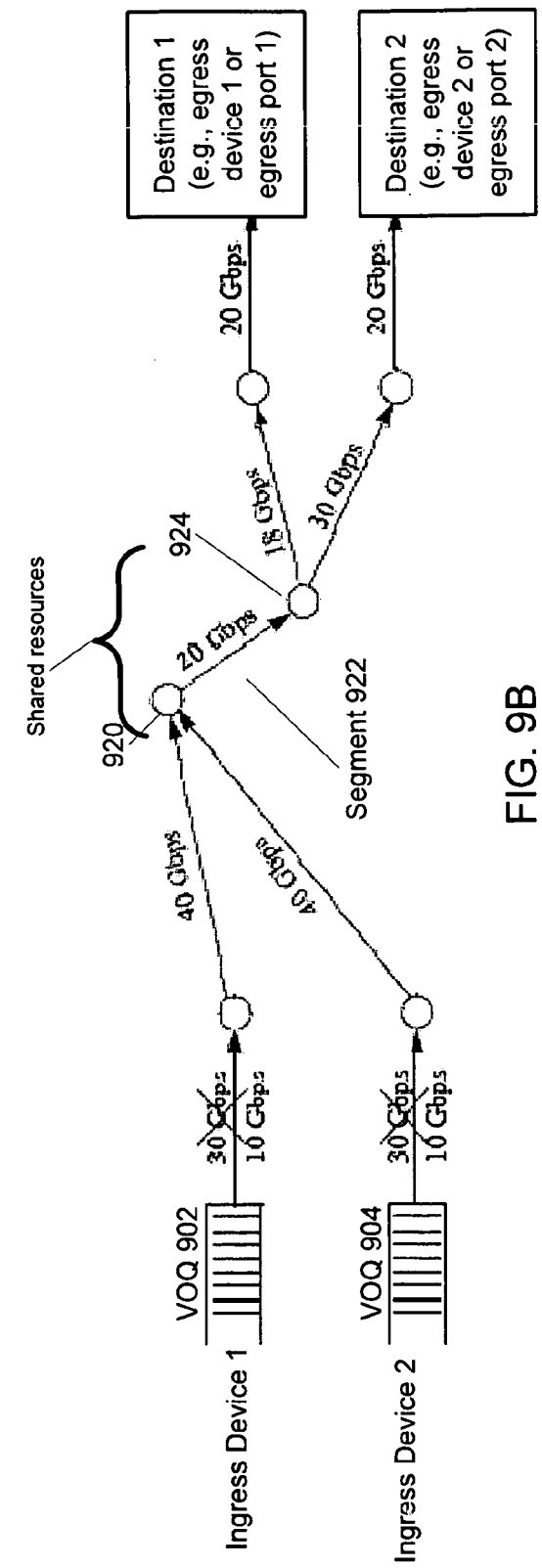
FIG. 9A
FIG. 9B

DISTRIBUTED CONGESTION AVOIDANCE IN A NETWORK SWITCHING SYSTEM

CROSS-REFERENCE TO RELATED APPLICATIONS

This application claims priority to U.S. Provisional Application Ser. No. 60/794,385, filed on Apr. 24, 2006, entitled "Network Switching System with Variable Length Header Set, Variable Length Addresses, and Distributed Congestion Avoidance," incorporated herein by reference.

BACKGROUND

A variety of network switching systems have been developed, such as routers, switches and the like. A switching system may commonly include multiple devices, such as switches, line cards or other devices. Each device may include one or more ports. Depending on the direction of traffic, a port may act as an input (or ingress) port or an output (or egress) port. One function of a network switching system is to receive packets (messages) on an ingress port, and forward or route the packet via a selected egress port.

Devices may be combined or coupled together in a variety of arrangements, including a ring interconnect, a mesh interconnect, a stacked arrangement, or other arrangement. Switch fabric devices, such as shared memory switches, a cross bar switch or other switch fabric device, may be used in some cases to provide interconnections between network switch devices (e.g., line cards, switches, network processors), e.g., to provide higher bandwidth.

Congestion, in some cases, may be a problem for networking switching systems. Congestion may occur when an offered load of network traffic exceeds the processing or forwarding capacity of the affected element (e.g., switch, port, line card). Congestion may result from, for example, speed mismatches (e.g., fast ports forwarding to slow ports), oversubscription (e.g., multiple ports forwarding to a single port or group of ports of lesser total bandwidth), etc. In some network switching systems, FIFOs (first in, first out buffers) are used to absorb excess traffic near a congestion point. When a FIFO fullness at an egress device exceeds a congestion threshold, an indication is usually provided to the traffic source(s). This is an example of a system that detects congestion, and then reacts to the congestion.

Other types of network switching may use relatively inflexible packet formats and header formats, which may in some cases cause significant overhead for those systems.

SUMMARY

According to an example embodiment, a network switching system may be provided. The network switching system may include a plurality of ingress devices. One or more of the ingress devices may include a plurality of ports and a plurality of traffic queues (such as VOQs) to store traffic to be transmitted via one or more shared resources to an egress device of the network switching system. One or more of the ingress devices may be configured to exchange (e.g., transmit and receive) traffic queue state information with one or more other ingress devices within the network switching system. One or more of the ingress devices may also be configured to adjust a transmitted traffic load from one or more of the traffic queues (or VOQs) based on the queue state information received from other ingress devices.

According to another example embodiment, a network switching system may include a plurality of network devices, each network device including a plurality of virtual output queues (VOQs) for storing traffic to be forwarded to a destination. The network switching system may include at least one intermediary device coupled between the network devices. One or more of the ingress devices being configured to receive queue state messages indicating a state of the VOQs of one or more of the other network devices of the network switching system. One or more of the network devices also being configured to adjust a transmission rate from the VOQs based on the received queue state information received from one or more other ingress devices.

According to an example embodiment, a total offered traffic load for a shared resource within a network switching system may be determined, the total offered traffic load may include, for example, a sum of offered traffic loads from one or more active virtual output queues (VOQs) of the network switching system. A capacity of the shared resource within the network switching system may be determined. A transmission rate from one or more of the active VOQs over the shared resource may be adjusted such that the total traffic load from the active VOQs does not exceed the capacity of the shared resource. A network device (e.g., switch) within the network switching system may receive queue state messages from the other network devices, indicating a queue state (e.g., empty/non-empty state, a level of fullness) for one or more VOQs. In this manner, each network device in the network switching system may, for example, determine a global or overall offered traffic load from multiple VOQs or multiple network devices, and each network device may adjust a transmission rate from one or more of its VOQs, e.g., to avoid exceeding a capacity of the shared resource.

The details of one or more implementations are set forth in the accompanying drawings and the description below. Other features will be apparent from the description and drawings, and from the claims.

BRIEF DESCRIPTION OF THE DRAWINGS

FIG. 9A is a diagram illustrating network devices adjusting traffic loads across a shared resource in a network switching system according to an example embodiment.

FIG. 9B is a diagram illustrating network devices adjusting traffic loads across a shared resource in a network switching system according to another example embodiment.

DETAILED DESCRIPTION

Figure 1:
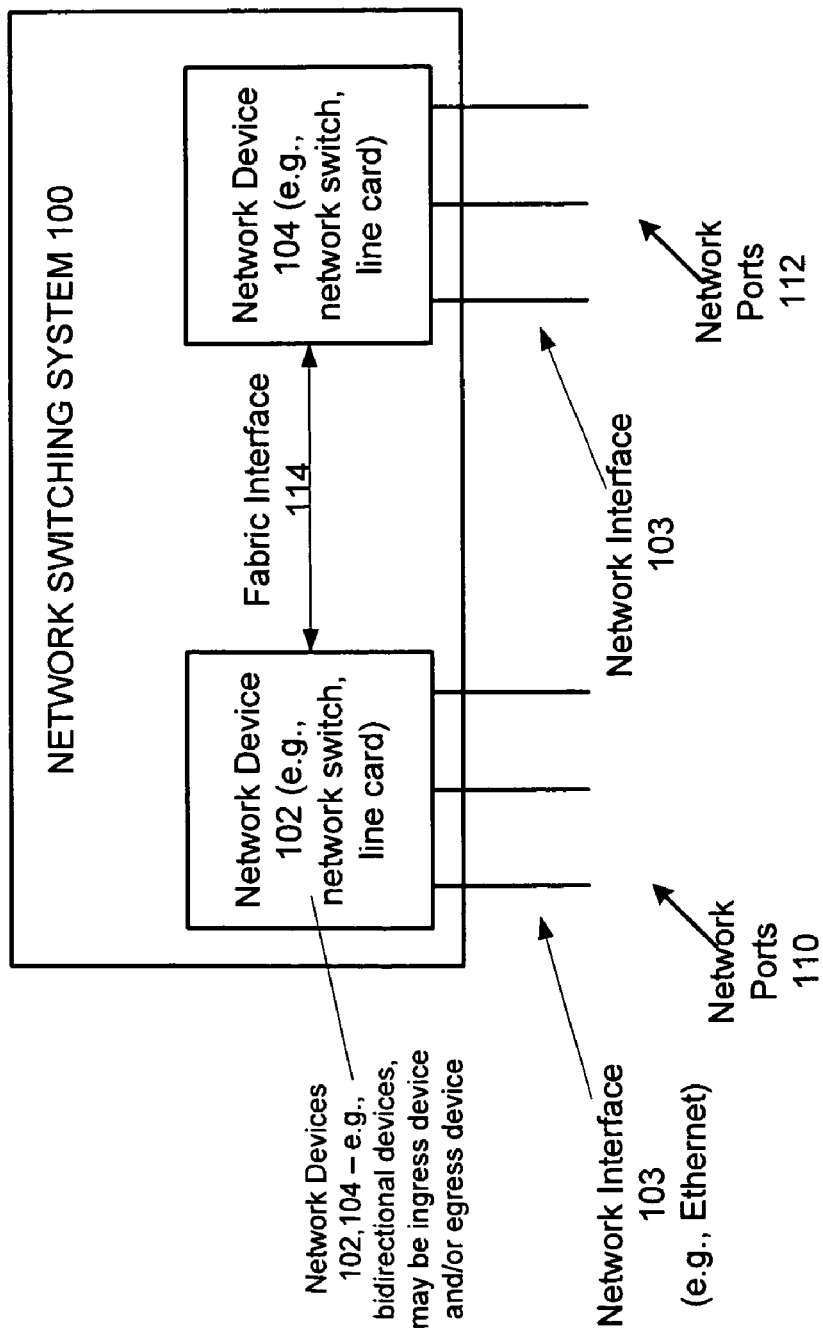
FIG. 1 is a diagram of a network switching system according to an example embodiment.

In a switching system, data in the form of packets, cells, or both, may be received at an input or "ingress" device and may be routed to an output or "egress" device. A network switching system may include a plurality of network devices (e.g., switches, line cards, or other network devices). Each network device may operate as an ingress device and/or an egress device, depending on the direction of traffic flow for a particular packet or cell. For example, ports of network devices may be bidirectional. Within a network switching system, network devices may be coupled together directly or indirectly. For example, although not required, one or more intermediary devices (e.g., fabric devices, buffered cross bar switch, shared memory switch, or other devices) may couple or be provided between the network devices.

According to an example embodiment, each ingress device (or network device) may determine an overall or global traffic load offered for one or more destinations, path segments, or resources in a network switching system, e.g., based on received queue state messages received from the other ingress devices in the network switching system. The queue state messages may indicate, for example, a queue state (e.g., an empty/non-empty state or a level of fullness of the queue. A resource (e.g., path segment, intermediary device, or switch fabric device) may be shared among multiple active (e.g., non-empty) queues. The queues may be, for example, virtual output queues (VOQs). Based on a total offered traffic load for a shared resource, e.g., including traffic from multiple VOQs, one or more network devices in the network switching system may adjust a transmission rate from one or more of its active queues or VOQs over the shared resource such that the total traffic load from a plurality of queues does not exceed the bandwidth or traffic capacity (e.g., bit rate capacity) of the shared resource.

Thus, for example, by exchanging queue state information between network devices in a network switching system, congestion in the switching system may be avoided in some cases (e.g., anticipated and transmission rates adjusted to avoid congestion). By exchanging queue state information between ingress devices, an overall or global offered traffic load for a resource (e.g., path segment, fabric device or other resource) may be determined by each network device in the network switching system. Based on this global demand of a shared resource, each network device may, for example, adjust a transmission rate for one or more of its active VOQs that are using the resource to use up to, for example, approximately a fair portion (or other amount) of the bandwidth or traffic (e.g., bit rate) capacity, such as approximately $1/N^{th}$ of the bandwidth or traffic capacity for the shared resource for N VOQs sharing the resource, according to an example embodiment. For example, if the traffic capacity of a resource (e.g., path segment) is 9 Mbps and there are 3 VOQs sharing that resource, then each VOQ may adjust its transmission rate to $1/3^{rd}$ of the traffic capacity ($1/3^{rd}$ of 9 Mbps), or to 3 Mbps per VOQ. In this manner, the group of VOQs or network devices transmitting across a shared resource may, at least in some cases, avoid congestion by typically not exceeding the bandwidth or traffic (e.g., bit rate) capacity of the resource, for example.

FIG. 1 is a diagram of a network switching system according to an example embodiment. Network switching system 100 may include one or more network devices, such as network devices 102, 104, etc. Network devices 102, 104 may be network switches, routers, line cards, or other network devices. Each network device may be a bidirectional device, and may be considered an ingress (or input) device and/or an egress (or output) device, depending on the direction of travel of a particular packet, for example. Each network device may include one or more network ports, such as network ports 110 for network device 102 and network ports 112 for network device 104. Network devices 102 and 104 of network switching system 100 may communicate with external devices (not shown) using network ports 110 and 112 via a network interface 103. Network interface 103 may be, for example, an Ethernet interface, or other network interface. Network devices 102 and 104 may communicate with each other within network switching system 100 via an internal switching system interface that is referred to herein as a fabric interface 114.

Although interface 114 may be referred to as a fabric interface, the fabric interface 114 may provide an interface to allow network devices to communicate with each other within a network switching system, both in the presence of a switch fabric (or other intermediary devices) and in the absence of a switch fabric or other intermediary device coupled between the network devices. Therefore, network devices within switching system 100 may communicate via a fabric interface 114, either directly as shown in FIG. 1, or via one or more intermediary devices (e.g., via switch fabric devices, shared memory switches, buffered cross-bar switches or other intermediary devices), not shown in FIG. 1. Thus, the term fabric interface is not limited to a switching system that employs a fabric or other intermediary devices, but may include the case where network devices may be coupled directly together, as shown in FIG. 1, for example.

A network switching system 100 may be provided, and may include any number of network devices that may be interconnected. The multiple network devices (e.g., 102, 104) may appear to external networks or external devices as a single logical device, for example, based on the interconnection of the plurality of network devices 102, 104, etc. via the fabric interface 114.

Overall, network switching system 100 may receive and process a received packet (e.g., Ethernet packet) via an ingress port of an ingress device (e.g., the network device that receives the packet), and may forward the packet to another (e.g., egress) port of the same or different network device. The egress device of the network switching system may forward the packet on to another device (not shown) outside the network switching system, via a network interface. The port which received the incoming packet may be referred to as an ingress port on the ingress device for this particular packet, and the output port for this particular packet may be referred to as the egress port on the egress device. The packet may, for example, be received via an ingress port (of an ingress network device), and may be transmitted to an external device (not shown) via an egress port (of an egress network device). Each port (and also each network device) may be bidirectional, and thus, the use of the term "ingress" or "egress" may, for example, be with respect to a particular packet or a particular traffic flow direction, according to an example embodiment.

Figure 2:
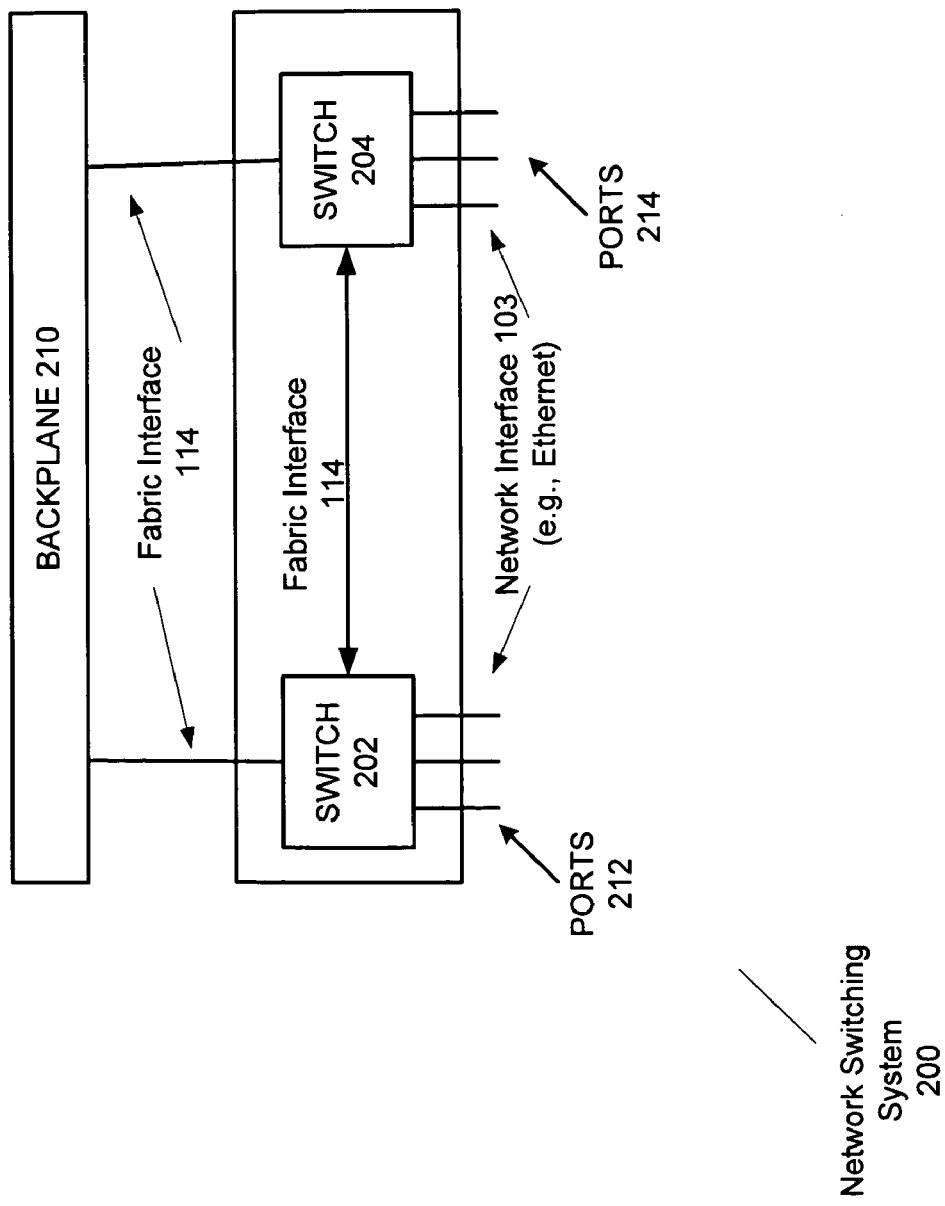
FIG. 2 is a diagram of a network switching system 200 according to another example embodiment.

FIG. 2 is a diagram of a network switching system 200 according to another example embodiment. A plurality of network devices, shown as switches 202 and 204, may include network ports 212 and 214, respectively. The switches 202 and 204 may be coupled together via fabric interface 114, and may also be coupled via a backplane 210, for example.

A network switching system may include network devices coupled together in a variety of arrangements or configurations, such as ring interconnection, a mesh interconnection or configuration, or other configuration.

Figure 3:
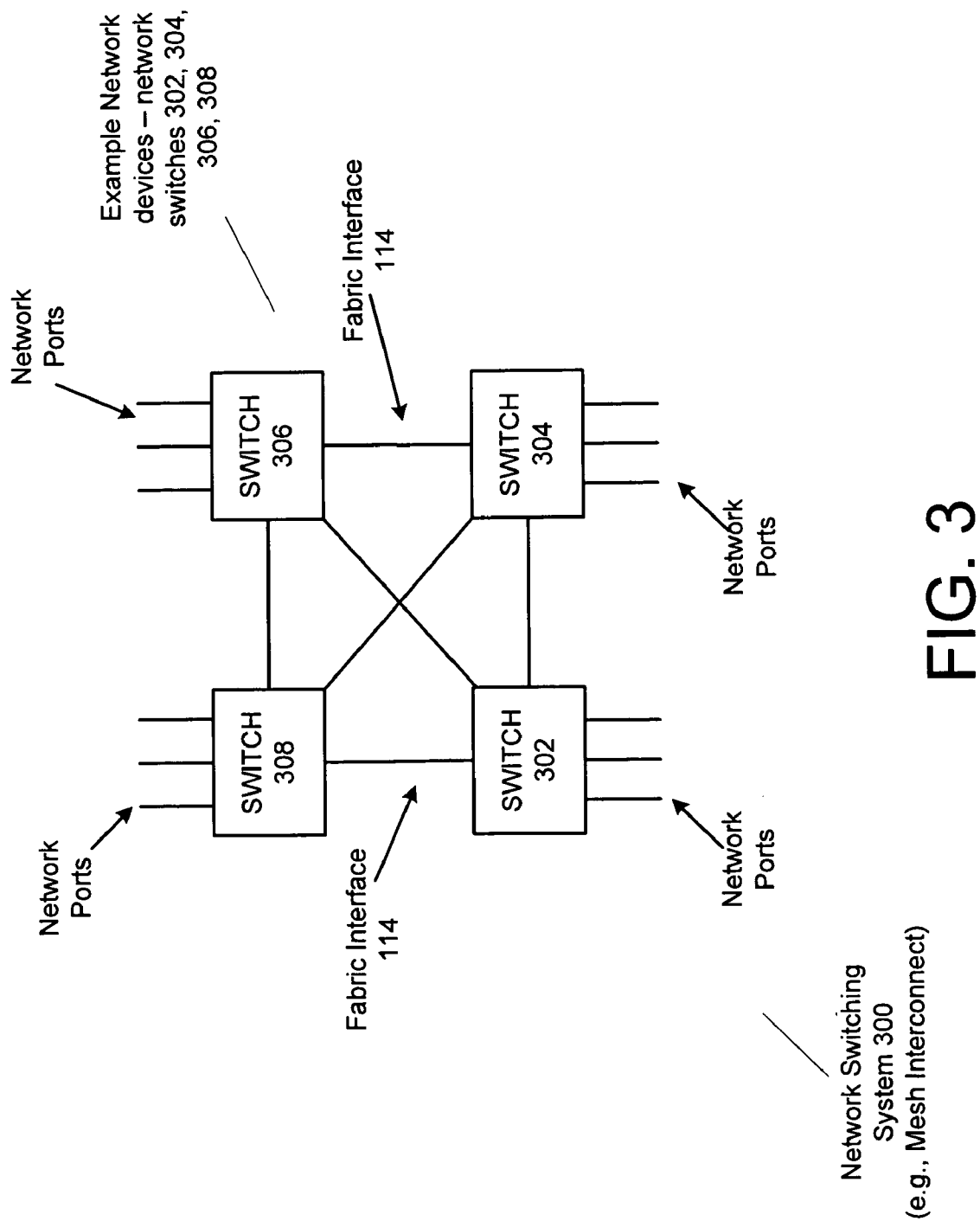
FIG. 3 is a diagram of a network switching system 300 according to another example embodiment that employs a mesh interconnect.

FIG. 3 is a diagram of a network switching system 300 according to another example embodiment that employs a mesh interconnect. A plurality of switches (or other network devices), such as switches 302, 304, 306 and 308 may be coupled together in a mesh interconnect as shown, with each switch including one or more ports. Each switch (e.g., switch 302, 304, 306 or 308) may communicate with other switches in the network switching system 300 via fabric interface 114.

Figure 4:
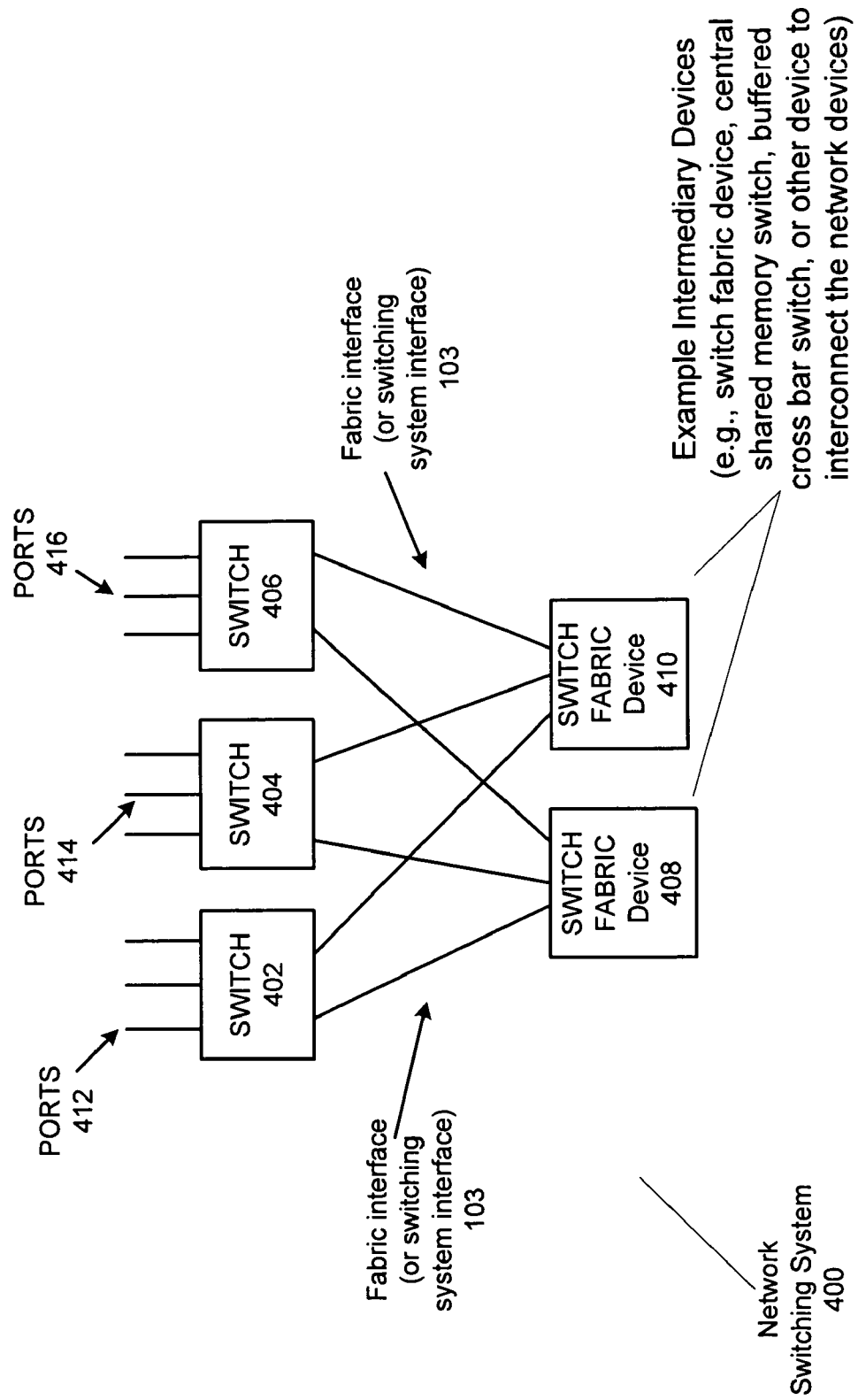
FIG. 4 is a diagram of a network switching system 400 according to another example embodiment that employs one or more intermediary devices.

FIG. 4 is a diagram of a network switching system 400 according to another example embodiment that employs one or more intermediary devices. Referring to FIG. 4, a network switching system 400 may include a plurality of network devices, such as switches 402, 404, and 406. Each of the switches 402, 404 and 406 of network switching system 400 may be coupled to one or more of the other network devices via one or more intermediary devices 408, 410. In this example embodiment, the switches are coupled together via switch fabric devices 408 and 410. However, the network devices (e.g., switches 402, 404, 406) within network switching system 400 may be interconnected via any type of intermediary device(s), such as switch fabric device, shared memory switch, cross bar switch or other device. Any number of intermediary devices may be provided.

According to an example embodiment, a network switching system may include a scalable switch fabric may be used communicate or transmit received packets or cells to other network devices. For example, received packets may be broken into smaller units of data (e.g., cells) and then distributed in a round-robin or other fashion to the available switch fabric devices. If a link (segment) or switch fabric device fails, it may be taken out of the round robin rotation and forwarding behavior may continue. According to an example embodiment, the fabric interface 114 employed as an internal network switching interface may support both packet and cell-oriented data transport.

Also, although in this example embodiment, each switch or device may be interconnected to other switches via one hop (e.g., via one intermediary device), in other example embodiment, one or more network devices may be coupled to one or more other network devices via multiple hops (e.g., via multiple switch fabric devices, or multiple crossbar switches or shared memory switches). Thus, one or more paths may be provided between ports of each switch as an ingress device, via one or more intermediary devices, to another switch as an egress device. The intermediary devices and path segments (or links) between intermediary devices (or switch fabric devices) or between an intermediary device and a switch may be shared among multiple paths (or shared among multiple destinations). Thus, the term shared resource may be used to generally describe any resource (e.g., intermediary device, switch fabric device, crossbar switch, shared memory switch or other device) that may be shared, e.g., shared between multiple paths or shared between multiple network devices or switches, for example. The network switching systems illustrated in FIGS. 1-4 are merely some example system configurations, and many other types or configurations of network switching systems may be used.

Figure 5:
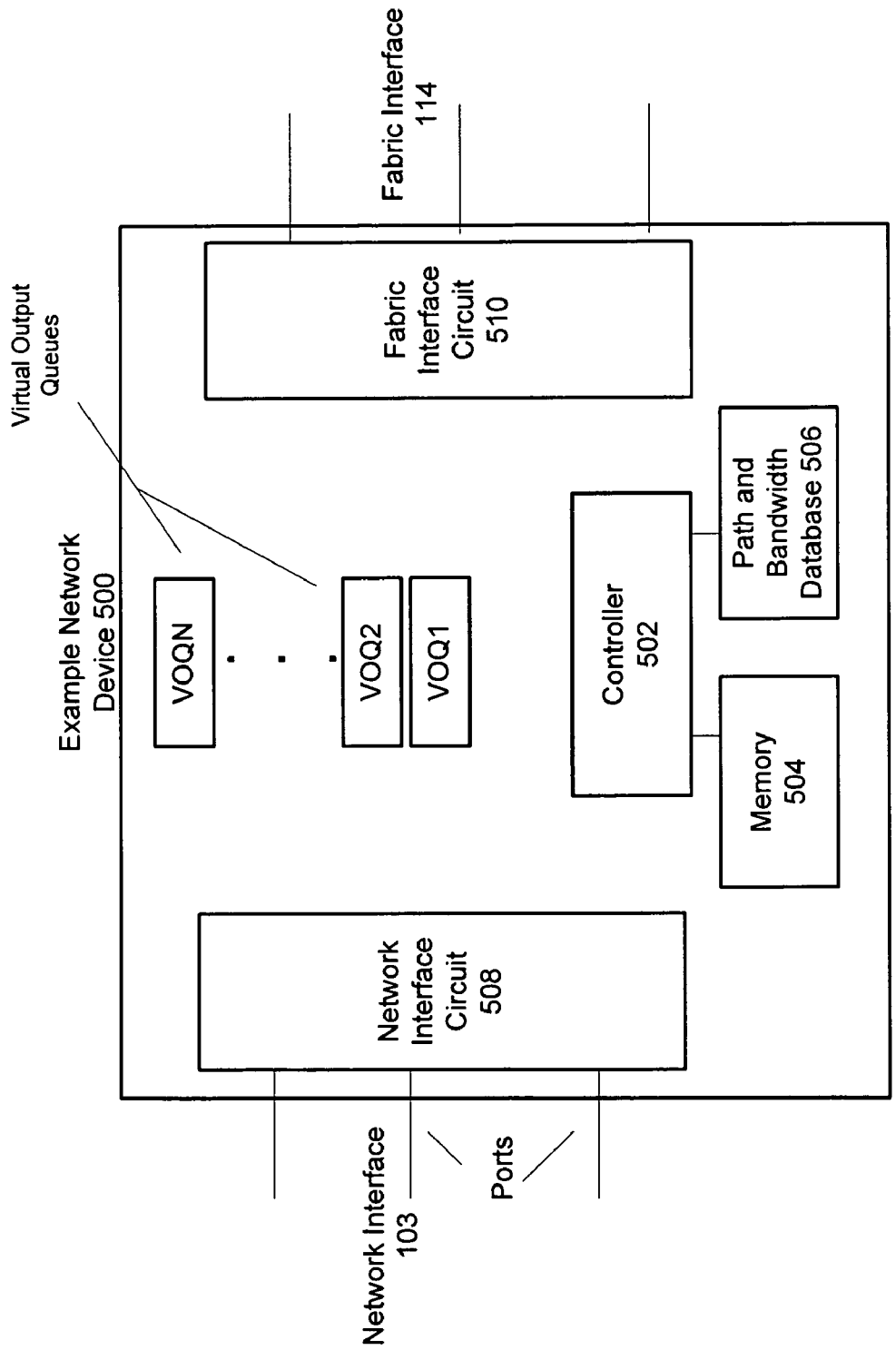
FIG. 5 is a diagram illustrating a network device according to an example embodiment.

FIG. 5 is a diagram illustrating a network device according to an example embodiment. Network device 500 may be any type of network device, such as a switch, router, line card, or other device. Network device 500 may include a network interface circuit 508 providing a network (e.g., Ethernet) interface 103 via one or more network ports. A fabric interface circuit 510 may provide a fabric interface 114 via one or more fabric interface ports. Thus, according to an example embodiment, network device 500 may include both network (e.g., Ethernet) ports and fabric interface ports. Network device 500 may include a controller 502 to provide overall control of network device 500, a memory 504 to store data, instructions or other information, and a path and bandwidth database 506.

Path and bandwidth database 506 may, for example, store information indicating the network configuration and/or paths within a network switching system to which network device 500 may be coupled (or may be a part of). For example, path and bandwidth data base 506 may identify the path segments interconnecting various network devices (e.g., via one or more intermediary devices) and a bandwidth or traffic (e.g., bit rate) capacity for each segment. This path and bandwidth database 506 may be updated based on changes, e.g., updated as the configuration of the network switching system changes (such as new intermediary device added or removed), or as bandwidth or traffic capacity on various segments or resources changes, etc.

Network device 500 may also include a plurality of queues to store packets and/or cells to be transmitted or forwarded across a network switching system. According to an example embodiment, virtual output queues (VOQs) may be used, such as VOQ1, VOQ2, VOQ3, . . . VOQN for N VOQs. There may be, for example, one virtual output queue (VOQ) at an ingress network device storing cells or packets to be transmitted to each destination. Thus, within a network device 500 (as an ingress device), there may be an association between a virtual output queue (VOQ) and a destination, in an example embodiment. In an example embodiment, there may be one VOQ in an ingress device per destination, for example. A destination may include, for example, within a network switching system, an egress device, a port or physical port (e.g., egress port) of an egress device, a virtual port of an egress device, etc. The use of VOQs may, for example, avoid, or at least decrease, head of line blocking.

If multiple network devices are interconnected within a network switching system (e.g., as shown in the example network switching systems of FIGS. 1-4), then multiple network devices may each have a VOQ (or multiple VOQs) associated with (or transmitting packets or cells to) the same destination. This may create a situation where a VOQ (e.g., VOQ1) in each of ingress device 1, device 2 and device 3 (as an example) are all transmitting to the same destination (e.g., a same port or a same egress device). This, as an example situation, may cause one or more resources (e.g., intermediary devices, path segments) within the network switching system to be shared among multiple VOQs. This resource sharing may, in some cases, create congestion, such as in the case where the overall traffic load from multiple VOQs may exceed the bandwidth or bit rate capacity of the shared resource. Resource sharing may also occur where two VOQs are transmitting to different destinations, but may share a path segment between their respective paths from ingress device to destination, for example.

The network interface 103 and fabric interface 114 may use different formats for carrying messages or units of information. For example, network interface 103 may allow the transmission and receipt of packets (e.g., Ethernet packets), including a packet header, packet body and a trailer. The header may include fields such as addresses for source and destination, and other fields. The trailer may include, for example, a cyclic redundancy check or CRC, such as a 32-bit CRC to allow for error detection for the packet.

The fabric interface 114 may provide an interface by which fabric cells and/or fabric packets may be forwarded from an ingress device to an egress device within a network switching system. Also, according to an example embodiment, control or management messages may be transmitted in-band. The fabric interface 106 may be used so that the multiple network devices within the network switching system (e.g., switches 102 and 104 of FIG. 1) may appear as a single logical device and may connect the network devices or switches 102 and 104 along an in-band channel for full connectivity of the ports 110 and 112. The in-band channel may be capable of carrying data messages in the form of packets, cells, or both and the in-band channel may also be capable of carrying control and/or management messages. According to an example embodiment, a network packet received via network interface 103 (e.g., an Ethernet packet) may be encapsulated by the ingress device in a fabric packet and forwarded to an egress device of the network switching system (e.g., of network switching system 100 or 400). Alternatively, the received network packet may be segmented by the ingress device and forwarded via a group of fabric cells to an egress device.

In an example embodiment, the fabric interface 114 may provide a transport method that may be used for packet data transfer and related activity in a network switching system (or within a network switching environment). According to an example embodiment, fabric interface 114 may be used within a network switching system. Fabric interface headers (referred to herein as fabric headers) may be created by an ingress device (e.g., by network interface circuit 508, controller 502 and/or fabric interface circuit 510) and prepended to network packets to create a fabric packet (or after segmentation, multiple fabric cells). These fabric headers may then, for example, be interpreted by one or more intermediary devices as the packets are forwarded to their intended egress devices.

In a system with multiple ports, congestion is a possibility. When those ports reside on multiple discrete devices (or different network devices) within a system, for example, then the management of the potential congestion may include the communication of congestion-related information between the affected devices, according to an example embodiment. According to an example embodiment, the fabric interface 114 may provide services that may be used for exchanging bandwidth and congestion related information and resolution for a network switching system, as described in greater detail below.

According to an example embodiment, the fabric interface 114 may allow for neighbor and topology discovery (e.g., within a network switching system) between different network devices of a network switching system, monitoring the health or status of the individual fabric interfaces (or path segments) and monitoring the status of participating network devices and intermediary devices. Fabric interface 114 may also provide a communications channel between controllers (e.g., controller 502) associated with each network device and/or intermediary device to allow for control and/or management of the network switching system, either in a distributed fashion, or via a central or remote controller or CPU, as examples.

According to an example embodiment, fabric packets and/or fabric cells may be transmitted between an ingress device and an egress device within a network switching system. This may involve, for example, receiving a network (e.g., Ethernet) packet, removing the network packet CRC, generating and prepending a fabric packet header to the network packet, generating and attaching a fabric packet CRC as a trailer to the fabric packet, and then forwarding the fabric packet from an ingress device to an egress device within the network switching system.

Alternatively, the fabric packet may be segmented and transmitted as a plurality of cells, which are typically of a smaller size than a fabric packet. Each fabric cell may typically include a header that may include, for example, a destination address to identify a destination (e.g., which may be associated with a destination, such as an egress device or egress port) and a sequence number to allow the plurality of fabric cells to be reassembled into a fabric packet at the egress device. The egress device may also use the attached CRC of the fabric packet to perform error detection for the fabric packet. In an example embodiment, the egress device may then strip off the fabric header of a received fabric packet (or group of fabric cells) and attach a new CRC as a trailer to provide (or regenerate) the network packet, which may then be forwarded via a network port of the egress network device.

According to an example embodiment, referring to FIG. 5, if a network (e.g., Ethernet) packet is received via a port of network interface 103, and forwarded by an ingress device to an egress device (not shown) via fabric interface 114, the network interface circuit 508 may perform receive MAC (media access control) processing (such as converting the packet to a fabric packet or fabric cells) on the received network packet, and buffer or store the fabric packet or fabric cells in a virtual output queue (VOQ). In an example embodiment, the VOQs may be provided at the ingress device, with one VOQ being associated with each destination (e.g., an egress device, an egress port or virtual port of an egress device within a network switching system), for example. The fabric packet or cells may then be transmitted by the fabric interface circuit 510 via the fabric interface 114. After, for example, being forwarded through one or more intermediary devices in the network switching system, the fabric packet or fabric cells may arrive at the egress device of the network switching system. The fabric interface circuit 510 may receive and perform receive MAC processing of the received fabric packet or fabric cells, such as performing reassembly of the fabric packet and stripping off the fabric header and fabric CRC, and generating a network CRC to regenerate the network packet. The network packet may then be transmitted from the network interface circuit 508 of the egress device via the network interface 103, for example. This is merely an example embodiment, and various functions or tasks may be performed by controller 502, network interface circuit 508 and fabric interface circuit 510.

According to an example embodiment, a fabric packet may include a variable header set. The headers that may be included in the fabric header set will be explained in more detail below. In general, the number and type of headers used for a fabric packet may vary based on the type of packet and/or the type of application. In one example, a portion of the header set may be used to associate destination and/or in band routing information for an incoming packet, such as an Ethernet packet. For example, an incoming Ethernet packet may be encapsulated in a fabric packet, that may include a header set, where the header set may include a fabric packet destination header or address in the header set, to allow forwarding or routing the fabric packet across the network switching system (e.g., 100, 200, 300, or 400) to an egress device of the network switching system. An ingress device at a network switching system (e.g., 100, 200, 300, or 400) may add a fabric header set to encapsulate the network packet in a fabric packet to be forwarded to an egress device of the network switching system. The header set may include, for example, a series of headers that may be added to a packet as required in order to direct it to its intended destination and to convey any additional information required for further handling of the packet, e.g., by one or more intermediary devices of the network switching system.

Figure 6:
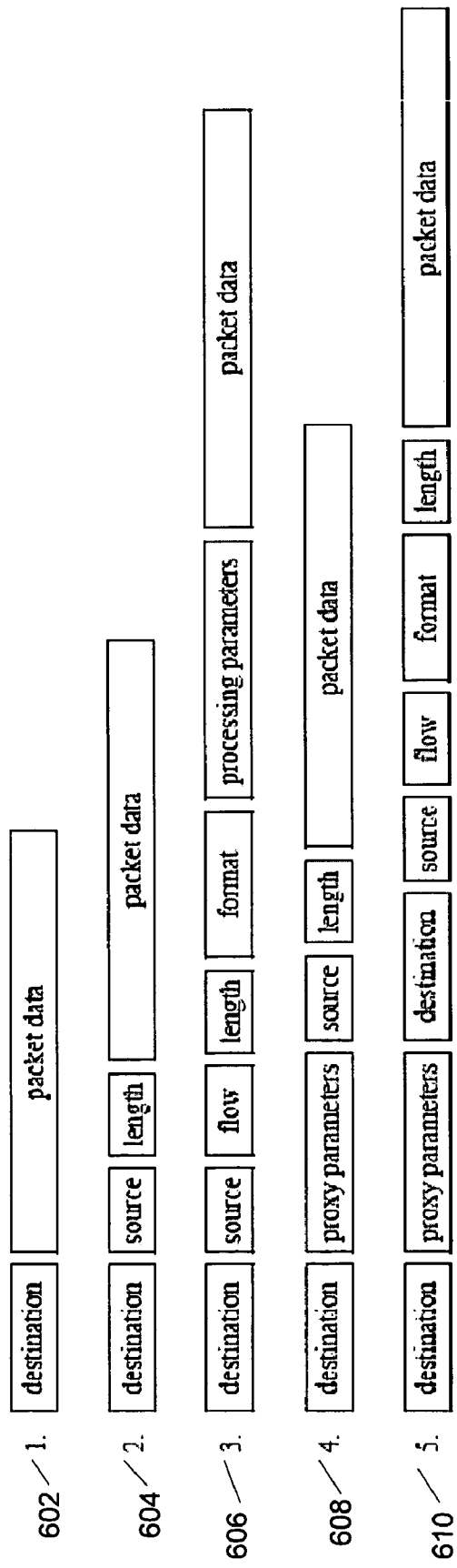
FIG. 6 is a diagram illustrating several examples of a header set 600 that may be used by a network switching system according to an example embodiment.

FIG. 6 is a diagram illustrating several examples of a header set 600 that may be used by a network switching system according to an example embodiment. A variety of individual fields may be stacked up to build a header set for the network switching system that suits the needs of the packet. In each of these example header sets, the network packet (e.g., Ethernet packet) may typically be encapsulated into the fabric packet data (or fabric packet payload). The headers sets in FIG. 6 will be briefly described.

Referring to the example header sets shown in FIG. 6, a first header set 602 may include only a destination address, for example (in addition to the fabric packet data or payload). The fabric packet destination field 602 may be, for example, a 32-bit value that may allow the various intermediary devices of the network switching system to forward the fabric packet to a destination (e.g., egress device, egress port, . . . ).

A second fabric header set 604 may further include a source field (e.g., identifying a source such as an ingress device or ingress port) and a length field indicating a length of the fabric packet). A third fabric header set 606 illustrates an example header set that may be assembled when two network switches or two network processors are exchanging packets within the network switching system, e.g., across one or more intermediary devices. The header set 606 may include, for example, a flow field identifying a flow (or group of associated fabric packets), a format field to identify a format for the fabric packet, and one or more processing parameters. The flow, format and processing parameter fields may, for example, be used by an egress device within the network switching system to perform the required processing during egress handling of the packet.

Support for proxies makes it possible for a small number of devices to add sophisticated capabilities to a large number of lesser devices, for example. A proxy device may provide forwarding services, computational services, or both. A forwarding proxy may examine a packet and determine to which switching interface it should be forwarded and under what method. A computational proxy may perform operations such as encryption/decryption, compression, specialized tunnelling, or other such operations but may rely upon the device for destination information. Proxy devices may be located anywhere in any of the network switching systems 100, 200, 300, or 400, for example, coupled to or provided as part of a network device or intermediary device, or may be provided as a separate proxy device within a network switching system.

Headers sets 608 and 610 are example header sets that may be used, for example to support a proxy device. For example, an outer destination field may be used to deliver the packet to the proxy device and the proxy parameters may be consumed by the proxy device itself. The length and contents of the proxy parameters may be proxy-specific. If the header only contains a single destination value, then the proxy may be expected to determine the packet's destination and form a new destination header. The new destination header may be used to replace the destination and proxy parameters headers provided to the proxy device by the packet's source device. On the other hand, if a second destination header is included, as in the fifth header set 610, then the proxy device may only need to strip off the outer destination header and the proxy parameters in order to forward the packet on to its final destination within the switching system. Also, according to an example use with the fifth header set 610, the headers that follow the proxy parameters may be the headers required to build another fully formed header (or header set) for the fabric interface 114.

According to an example embodiment, the fabric header set may include a variable number of headers. This allows flexible header sets to be generated an appended to meet the needs of different applications. In addition, flexible header sets that allow different headers and different combinations of headers to be prepended to create a fabric packet may, at least in some cases, decrease overhead associated large headers.

According to an example embodiment, to provide a flexible header set including a variable number of headers, each (or at least some) of the fabric headers in the fabric packet header set may include a field that indicates the type of header that immediately follows the current header, which may be referred to as a "next header" field. The next header field of a header may be an N-bit field that specifies a header type of the next header. In an example embodiment, the fabric headers are typically not assembled arbitrarily or randomly. Rather, each particular header type may be followed only by a header that belongs to a limited subset of all of the available header types. In an example embodiment, only a subset of all possible header types may be possible as a next header for any given header. A different subset of possible next header types may be used for each type of current header. Limiting the range of next headers for each header may have the effect of prescribing a certain order and flow from one header to the next. These restrictions may also decrease the number of bits allocated in each header for the next header field.

As noted, the fabric interface 114 may support both packet and cell data transport. Packet-based transport may be provided, for example, for backwards compatibility with legacy switching devices. Cell-based transport, however, may provide advantages, such as decreasing overhead, and in some cases, may allow decreased buffering requirements in some devices. In some cases, those devices that provide VOQs may already have substantial buffering capabilities, and thus the cell-to-packet and packet-to-cell conversion may typically not provide an increased buffering burden for such devices, for example. Cell-based forwarding across a network switching device may be beneficial because it may provide a finer bandwidth distribution across scalable switch fabrics (or other intermediary devices), and allow for an easier insertion of control messages without having to wait for gaps between large packets, for example. When forming fabric cells, destination and sequence information may be provided in a header of each cell to ensure that each cell reaches a same destination and to ensure that the packet can be properly reassembled at the destination or egress device. The other fabric headers that may be part of a fabric packet may be encapsulated (or included within) the payload of the first cell of a packet, for example.

According to an example embodiment, the fabric interface 114 may be used to convey or transport fabric packets or fabric cells. In yet another example embodiment, the fabric interface 114 may also be used to transmit Network or Ethernet packets. However, most of this description will focus on the transport via fabric interface 114 of fabric packets and fabric cells. Thus, fabric interface 114 may provide two different packet encapsulation modes: fabric packets and fabric cells. These different types of encapsulation may be used for different applications, for different devices, etc. For example, cell-based encapsulation (e.g., encapsulating a network packet in a group of fabric cells) may be used for communicating between ingress and egress devices (such as network switches, traffic managers and other devices, which may be connected directly to each other or indirectly via intermediary devices or switch fabric). In another example embodiment, fabric packet based encapsulation (e.g., encapsulating a network packet in a fabric packet) may be used, for example, when network switches or devices are communicating directly with attached network processor devices. These are merely some examples, and the disclosure is not limited thereto. Other types of devices and other configurations may be used.

Figure 7A:
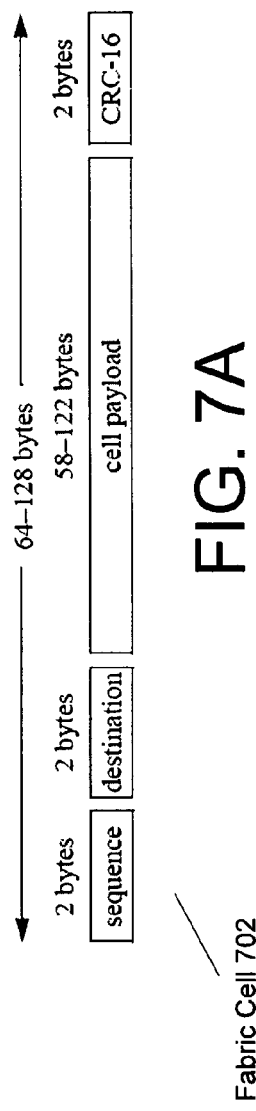
FIG. 7A is a diagram illustrating a format of a fabric cell according to an example embodiment.

FIG. 7A is a diagram illustrating a format of a fabric cell according to an example embodiment. The example fabric cell 702 may include a sequence number field to identify the sequence or order of the cells for each packet, a destination address field to identify a destination for the cell, a cell payload and a cell-specific CRC (e.g., a 16-bit CRC). This is merely an example cell format and other cell formats may be used.

Figure 7B:
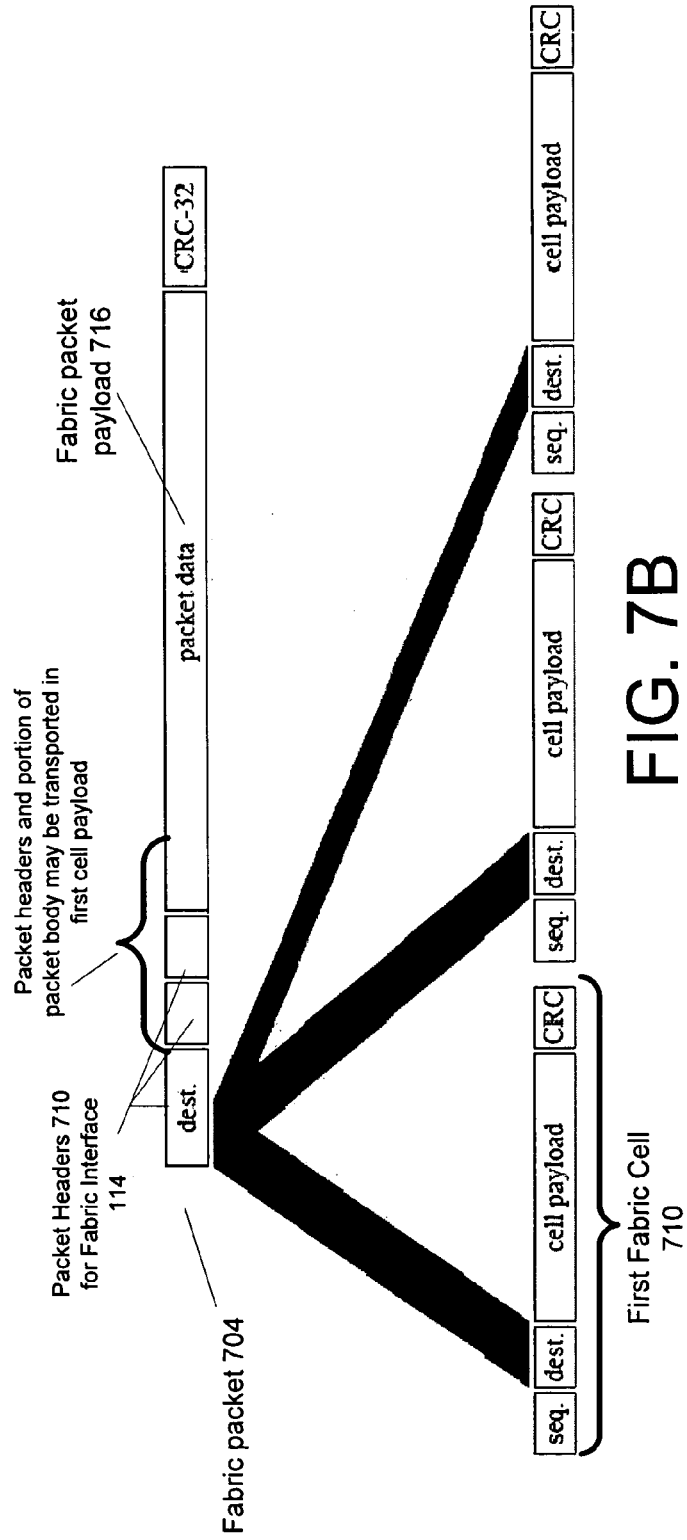
FIG. 7B is a diagram illustrating a segmentation of a packet into multiple fabric cells according to an example embodiment.

FIG. 7B is a diagram illustrating a segmentation of a packet into multiple fabric cells according to an example embodiment. First, in an example embodiment, although not required, a network (e.g., Ethernet) packet may be encapsulated into a fabric packet payload 716 of a fabric packet 704. Then, a fabric header set 710 may be generated and added (e.g., pre-pended) to the fabric packet 704. The fabric header set 710 may include, for example, a destination field, which may be, for example a 32-bit destination address field. The fabric header set 710 may include a variable number of headers. As noted above, each (or one or more) fabric header may include a next header field to identify a next fabric header within the fabric header set 710. This may provide improved flexibility and efficiency when generating fabric packets for transmission over the network switching system by allowing a header set to be tailored to a specific application or usage, for example.

According to an example embodiment, the fabric packet 704 may be segmented and transmitted across the network switching system to an egress device as a plurality of fabric cells, which are typically smaller in size than fabric packets or network packets. The process of segmenting a packet into a group of fabric cells will now be briefly described according to an example embodiment.

According to an example embodiment, a fabric cell destination address may be determined as a subset (or portion) of the bits of the packet (either network or fabric packet) destination address. For example, if a packet address is four bytes, then a cell destination address may be generated as the first two bytes (or the second two bytes) of the packet destination address. A cell sequence header, which may include a sequence number, may be determined or computed and placed at the front of each fabric cell to ensure in-order assembly of the cells to generate the original packet. 16-bit cell-specific CRC value is then calculated over the cell and appended as a trailer to the cell. The packet's original 32-bit CRC may typically be discarded. Another 32-bit CRC for the packet may typically be generated and appended to the packet at the egress device before forwarding the packet or transmitting the packet onto a packet-oriented network, for example.

As shown in FIG. 7B, the first two bytes of the packet destination address may be used as a cell destination address for each cell. This cell destination address may be mapped to or associated with one or more egress devices or egress ports, for example, within the network switching system. The remaining portion (e.g., other two bytes) of the packet destination address, and the other fabric packet header fields may be transported in the first cell payload, for example. The packet CRC may typically be discarded. The other cells may be similarly generated, with the same destination address as the first cell, a cell sequence header (including a sequence number), and a cell payload that is used to transport a portion of the original packet. A cell-specific CRC (e.g., 16-bit CRC) may be appended to each cell.

According to an example embodiment, the sequence header for each cell may include a number of fields, such as: position (e.g., indicating start, middle or end of packet or entire packet), a source device (e.g., indicating the ingress device that is the source of the associated cell), and a sequence number.

A fabric packet may include a number of different headers as part of a header set. These headers may include, for example, a destination header, a source aggregate header, a length header, a format header, a flow header, a proxy parameters header, processing parameters, and a bandwidth management header (e.g., to provide or generate a queue path message, path state message and path rate message, as examples). These are merely some examples of the types of headers that may be included in a fabric packet or cell. In some cases, one or more of these headers may be optional, and may be provided in some different combinations. Some of these headers will be briefly described.

According to an example embodiment, a destination header for a fabric packet may include a number of fields. The destination header may be, for example, a 32 bit value, that includes the following fields: drop precedence field indicating a cell's or packet's drop precedence, a 24 bit (e.g., bits [0:23]) destination address identifying a destination for a cell or packet. When serving as a cell's destination, only bits [12:23] may be used, for example, as the destination address. Although this is merely an example and other formats may be used. A hierarchical addressing structure and longest prefix matching techniques, for example, may be used for destination addresses to forward fabric cells or packets to their destinations, according to an example embodiment. The destination header (like other fabric headers) may also include a next header field (e.g., bits [0:3]), which identifies the header that follows the current header.

The destination header is used primarily for moving cells and packets from an ingress device, e.g., through one or more intermediary devices, to one or more egress devices of a network switching system. When cells are being forwarded, for example, the leftmost (e.g., most significant) 16 bits of the destination header may typically be interpreted, while for packets, the entire 32-bit destination field may be interpreted. Thus, cells may have access to the drop precedence field and the upper 12 bits of the destination address, according to an example embodiment. In an example embodiment, the least significant 12 bits of the destination field and the next header field are typically not available or used by cells. For example, the least significant 12 bits of the destination address field and the next header field are usually not used or available to devices that merely forward cells (e.g., intermediary devices) and do not reassemble cells into packets, for example. In an example embodiment, the next header field may not be necessary (thus, may not necessarily be included in cells) because, for example, either a cell's payload (for middle or end cells) or the least significant 16 bits of the destination header will typically follow a cell's 16-bit destination header. The destination header may also include a test field to allow for test or debug.

According to an example embodiment, the destination field (or destination address field) within the destination header may not necessarily be divided up into discrete regions, but may have a hierarchical arrangement of information or sub-fields. These sub-fields or destination related information may include, for example, information that may identify an egress or proxy device, a physical port or ports (e.g., of the egress device), and bits or information that may identify the priority of the packet, for example.

A source aggregate header may identify a source aggregate of the associated packet. This header may be used in systems, for example, where intermediary and egress devices may be used for distributed multicast replication. This header may, for example, be used to prevent bridged packets from being multicast or flooded onto one or more ports that belong to the same multiport link aggregate via which the packet was originally received. For example, the source aggregate header may include a source aggregate field to be used to identify which one of possibly several link aggregates is the one via which the current packet was received. This information may be used, for example, to prevent an egress device from transmitting a packet onto more than one physical link of a single transmit link aggregate, as an example. The source aggregate header may also include a next header field to identify the next fabric header.

A length header may be used to indicate a length of a network (e.g., Ethernet) packet that is encapsulated inside a fabric packet. The length header may include, for example, a length field indicating a length (e.g., in bytes) of the reassembled Ethernet packet that is encapsulated in the fabric packet, and a next header field to identify a next header in the fabric header set.

A format header may be used to indicate a format of the received Ethernet or network packet. This format header may, at least in some cases, remove the need for the parsing of packets by an egress device, for example.

The format header may be used by the ingress device to convey to a proxy device or an egress device (or other device) the results of its parsing of a packet's Ethernet, IP and other headers. For example, this header may be added to the header set in cases where the ingress device parses the received Ethernet packet, for example. The structure of the header may include, for example, an outer MAC type field, then a series of 4-bit fields that identify the next Ethernet packets (based on the parsing of the Ethernet packet).

The format header may include several fields, such as, for example:
 a. Outer MAC type field—indicating a type of MAC encapsulation by the network packet, such as Ethernet v2, LLC/SNAP, etc.
 b. Header type field—identifies one or more of the headers present in the encapsulated network packet. For example, may identify the next 7 headers in the Ethernet packet
 c. Next header field—identifies the header that follows the current header (within the fabric packet header set). In this example, there may be, for example 4 possible next fabric headers in the fabric header set, based on the current header being a Format header. The next header field indicates whether this fabric header is followed by another format header, a processing parameters header (e.g., providing processing parameters for use by an egress device), or by packet data itself (fabric packet payload). According to an example embodiment, these are the only three options for the next header. Thus, only a subset of all fabric headers may be used as a next header, based on the current header. This may reduce the number of bits required for the next header field. In an example embodiment, the next fabric header may be identified by the next header field as one of (if current header is a format header):
   1. 00—format header
   2. 01—processing parameters header
   3. 10—packet data (fabric packet payload)
   4. 11—reserved A flow header may also be used to identify a flow for the current packet. A flow may be, for example, a group of related packets, or one or more packets from a same source or application, and/or directed to a same destination. For example, a flow may be a source, destination and priority combination that defines a connection or aggregate of connections and/or that may originate from and/or are destined to a same or collocated network locations. Other types of flows may be used as well. The flow header may include a next header field to identify a next header after the current fabric header.

The fabric header set may also include a proxy parameters header to provide supplemental processing information or instructions to a network switching system. Various devices or service blades may, for example, provide specialized types of services (e.g., encryption, traffic management or analysis, and the like). In some cases a packet may be routed from an ingress device to a proxy device within the network switching so that the proxy device may perform a service on/for the packet. Once the service is complete, the proxy device may forward the packet to its destination or to another proxy device. Thus, according to an example embodiment, a proxy header may allow ingress devices and proxy devices to provide or specify information or instructions to proxy devices. According to an example embodiment, intermediary devices may not typically examine or use the proxy header. The last proxy device to receive the packet with the proxy header may typically strip the proxy header, perform the requested processing, and then forward the packet to its destination, for example. The fabric header may also include a next header field.

Similarly, the fabric header set may include a processing parameters header to allow, for example an ingress device to convey additional information (e.g., packet processing instructions) to an egress device within a network switching system. The processing parameters header may be similar to the proxy parameters header, as it may convey additional packet processing or packet handling information or instructions that are not already provided in the other headers of the packet, for example. The processing parameters header may also include a next header field.

A device management header may also be included to convey device management messages from one device to another (e.g., from one network device to another, or from a network device to an intermediary device). The device management messages may be used to query a device's status, update its configuration, recover from an error, or perform other control or management related functions for the network switching system. Although not required, in an example embodiment, device management headers may typically follow a destination header, and are not typically followed by other fabric headers, for example. Packet data is typically not included for a device management packet, according to an example embodiment.

A bandwidth management header may be included in a fabric header set, for example. A bandwidth management header may be used to convey information related to bandwidth management and/or congestion avoidance. The packets or messages that include bandwidth management headers may be transmitted between ingress devices and egress devices of a network switching system, for example. This may allow congestion in coupled devices and switch fabrics to be avoided or decreased, e.g., via making an adjustment to data transmission rates or shaper settings, for example. In an example embodiment, bandwidth management headers may typically immediately follow a destination header, are not typically followed by other types of headers, and may typically not be used to convey packet data. This is merely an example, and other formats may be used.

Figure 8:
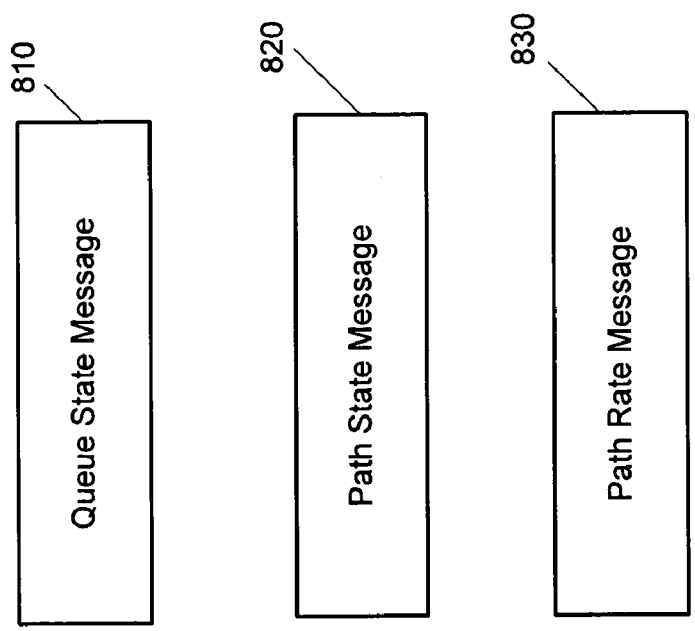
FIG. 8 is a diagram illustrating some example bandwidth management messages.

FIG. 8 is a diagram illustrating three different types of bandwidth management messages. Use of each of these subtypes of bandwidth management headers may result in the generation of a different bandwidth management message. A queue state header sub-type may be used for a queue state message 810; a path state header type may be used for a path state message 820; and a path rate header may be used for a path rate message 830.

The queue state message 810 may be used by ingress devices to convey or indicate the state of one or more VOQs (virtual output queues) at the ingress device. The queue state message 810 may be, for example, a 1-bit value indicating an empty or non-empty state of each VOQ, or a multi-bit value indicating a level of fullness of each VOQ. Thus, the queue state message 810 may include a field indicating a state of each VOQ (or for one or more VOQs) of the reporting ingress device, for example. Other information for each VOQ may also be transmitted in a queue state message 810, such as a requested data transmission rate for the VOQ, a traffic priority for queued traffic or the VOQ, and other information.

The queue state message 810 may include a queue state header, that may include node ID field identifying the ingress node that is reporting, an indication of the number of VOQs being reported (or an identification of which VOQs are being reported), and a queue state for each VOQ being reported, for example. This is merely an example format, and other formats may be used.

The queue state message 810 may be transmitted (e.g., to other devices in the network switching system) when there is a change in queue state (e.g., empty to non-empty, or increases in fullness), or may be sent out at specific time periods or intervals regardless whether there has been a change in queue state. Or, both techniques may be used to send out queue state messages (e.g., both when a change in a queue state occurs and sending out a queue state message at specific times or intervals regardless of a change).

The path state message 820 may be used to report a change of state of individual paths or path segments from active to suspended, or vice versa. For example, a path from an ingress device to an egress device via one or more intermediary devices may include one or more path segments. The path state message 820 may be used to report changes in path or path segment state (active, or suspended/inactive, as examples). The path state message 820 may be sent by a device, for example, when destinations are disabled due to the removal of a line card or stacked system element or other device or when a network switching system's port has been disabled due to link level flow control or for other reasons.

The path state message 820 may be transmitted or sent out when there is a change in path (or path segment) state, or may be sent out at specific time periods or intervals regardless whether there has been a change in path or path segment state. Or, both techniques may be used to send out path state messages (e.g., both when a change in a path segment occurs and sending out a path state message at specific times or intervals regardless of a change).

The path state message 820 may include a path state header, that may include a node ID field identifying the ingress node that is reporting its path state, an identification of the individual path or path segment that is being reported, and a path enabled bit for each path or path segment indicating that a specific path segment is enabled and traffic may be sent at the configured data rate, or if this bit is deasserted, then all traffic that uses the path or segment should be suspended and packets or cells dequeued at the appropriate VOQs, for example. This is merely an example format, and other formats may be used.

The path rate message 830 may be used to report change to the data rates (or bandwidth) available on each path segment. These changes in data rate/bandwidth may be due to auto-negotiation on a network port or due to changes to the configuration of a rate shaping function (adjustment of data transmission rate) anywhere along a path. For example, when a path segment decreases in capacity or bit rate from 20 Mbps to 10 Mbps, a path rate message 830 may be sent out by a network device or intermediary device (to other devices in the network switching system) indicating an updated traffic capacity (or bit rate) of 10 Mbps. Likewise, a path rate message 830 may be sent when a data rate of a path segment increases. Also, path rate messages may be sent out by devices or resources (e.g., network devices, intermediary devices, switch fabric devices) at specific intervals or time periods, regardless if there has been a change in a path segment rate. Also, both techniques may be used to transmit path rate messages (e.g., transmitting path rate messages when a change in path rate occurs as well as sending out path rate messages at specific times or intervals regardless of whether a change has occurred).

A path rate message 830 may, for example, include a path rate header, that may include a node ID field identifying the ingress node that is reporting path rates, a path ID to identify the path or path segment that is being reported, and a path rate field indicating a bit rate (or data rate) that may be accommodated on the associated path or path segment. The path rate indicates the bit rate that the associated path segment can accommodate. In other words, the path rate may indicate the capacity for the resource (e.g., traffic capacity or bit rate of the path segment).

Congestion in a network switching system may occur when an offered load of network traffic exceeds the traffic capacity or bit rate of one or more resources of the system. According to an example embodiment, each of one or more ingress devices in a network switching system may have one or more traffic queues (e.g., VOQs). According to an example embodiment, each ingress device may have a plurality of VOQs, with each VOQ being associated with a destination (e.g., egress device, egress port, or virtual port on an egress device). According to an example embodiment, the ingress devices may exchange queue state information with the other ingress devices of the network switching system. The queue state information may be exchanged, for example, by each ingress device transmitting queue state messages to the other devices indicating a state of its VOQs (e.g., empty/non-empty, or indicating a level of fullness of each VOQ, or other VOQ information). For example, the queue state messages may allow one or more of the network devices to obtain a global or overall view of the total offered traffic load over one or more shared resources in the network switching system, for example. Each network device, based on the queue state messages, may determine a total offered traffic load for a shared resource within the network switching system, where the total offered traffic load may include a sum of offered traffic loads from each of one or more VOQs. Each network device may then adjust a transmission rate or traffic load from one or more of its VOQs that are using the shared resource, e.g., such that a traffic capacity (such as bit rate) of the shared resource is not exceeded by the total offered traffic load across the shared resource. For example, the shared resource may be a path segment or intermediary device that is being used by multiple VOQs (e.g., across different network devices). Based on this global view, a network device in the network switching system may then adjust its transmission rate for one or more of its VOQs so that a total offered traffic load preferably does not exceed the capacity of one or more shared resources within the network switching system, according to an example embodiment.

For example, with respect to FIG. 4, each ingress device (e.g., each of switches 402, 404, and 406) may include a plurality of VOQs. Each VOQ may be associated with a destination. For example, switches 402, 404, and 406 may each include a VOQ that may be associated with a same destination, or at least use a shared resource within the network switching system. For example, a path from a VOQ of each ingress device (or switch) to a different destination may offer traffic load across (or share) one or more resources (e.g., intermediary devices, switch fabric devices or path segments). Each switch may transmit queue state messages (e.g., indicating a queue state for one or more VOQs) via fabric interface 103 to the other switches. In this manner, by exchanging queue state messages, one or more (or even all) of the ingress devices may determine an offered load for one or more shared resources. This may allow each ingress device to adjust its offered traffic load from one or more VOQs so that, for example, a total offered traffic load may not exceed the capacity of one or more shared resources. For example, the network or path configuration of the network processing system may be provided or stored within a path and bandwidth database 506, e.g., one copy of database 506 for the system 400 or a copy for each ingress device. Thus, each ingress device may determine one or more shared resources for each VOQ, as each VOQ is associated with or transmitting to an associated destination. In addition, each ingress device may receive path rate messages indicating a traffic capacity (e.g., bandwidth or bit rate capacity) of the one or more resources (e.g., intermediary devices or switch fabric devices, path segments) in the network switching system. Based on these path rate messages, each ingress device may, if necessary, update its path and bandwidth database 506 (e.g., storing traffic capacity for each of a plurality of resources or path segments). Each ingress device, e.g., based on the path and bandwidth database, may also determine one or more shared resources for VOQs of multiple ingress devices. Each ingress device may then adjust a transmission rate (or a transmitted traffic load) from one or more of its VOQs based on the queue state information and the capacity of one or more resources in the network switching system. For example, based on a capacity of the shared resource (e.g., indicated by path and bandwidth database 506 and/or path rate messages 830), an ingress device may then adjust an offered traffic load or transmission rate for one or more of its active VOQs (e.g., which are using the shared resource) such that the total offered traffic load from the active VOQs (e.g., across multiple ingress devices) may not exceed the capacity of the shared resource. For example, an ingress device may adjust a transmission rate from one (or more) of its VOQs transmitting across the shared resource to be approximately 1/Nth of the total capacity of the shared resource (or 1/Nth of the lowest shared resource in a path), where N may be the number of active VOQs offering traffic load over the shared resource, for example.

FIG. 9A is a diagram illustrating network devices adjusting traffic loads across a shared resource in a network switching system according to an example embodiment. A VOQ 902 may be provided at ingress device 1, while a VOQ 904 may be provided at ingress device 2. Both VOQs 902 and 904 may be associated with a same destination, shown as destination 910 (although VOQs 902 and 904 may be associated with different destinations as well). The destination 910 may be an egress device or egress port in the network switching system. As shown in FIG. 9A, VOQ 902 is coupled to destination 910 via a path that may include a number of resources, such as intermediary devices 902, 904, 906 and 908, and path segments 903, 905, 907 and 909. Similarly, VOQ 904 is coupled to destination 910 via a path that includes intermediary devices 912, 904, 906, and 908, and path segments 911, 905, 907 and 909. Thus, VOQs 902 and 904 may include a number of shared resources, such as intermediary device 904, 906 and 908 and path segments 905, 907 and 909, for example.

The VOQs 902 and 904 in the ingress devices 1 and 2 may be statically associated with particular destinations. A path may exist from each queue (or VOQ) to its associated destination. Each path may be made up of multiple segments. One of those segments may have a bandwidth or traffic capacity that may be less than or equal to the other segments of the path. This segment or resource having a lowest traffic (e.g., bit rate) capacity may represent the upper limit to which a VOQ may set its output transmission rate without exceeding the capacity of the resource, according to an example embodiment. When the resource or segment is shared by multiple VOQs, then the traffic capacity of the shared segment or resource must be allocated across multiple VOQs, which may typically further decrease the upper limit to which a VOQ may set its output transmission rate without exceeding the traffic capacity of the segment.

As shown in FIG. 9A, a capacity (e.g., traffic capacity or bit rate capacity) of each path segment is shown. For example, path segments 903 and 911 have a traffic capacity of 40 Gbps, path segment 905 has a traffic capacity of 25 Gbps, segment 907 has a traffic capacity of 18 Gbps, and segment 909 has a traffic capacity of 20 Gbps. Also, in this example, this networking system includes only ingress device 1 and ingress device 2. Or, ingress devices 1 and 2 otherwise determine that no other VOQs are offering traffic load across these shared resources, e.g., based on queue state messages exchanged between ingress devices or network devices. Each ingress device may also know or determine the network topology and path rates of each resource or segment, e.g., based on information stored in path and bandwidth database 506, which may be stored centrally within the network switching system or at each ingress device. Also, each ingress device may determine the path rates for each path segment based on path rate messages.

Therefore, as shown in FIG. 9A, ingress device 1 and ingress device 2, e.g., based on queue state messages, may determine a total offered traffic load for the shared resources. In this example, both ingress devices 1 and 2 may determine that VOQs 902 and 904 are active (non-empty), and also share the shared resources (based on their paths to destination 910). The path segment 907 has a lowest capacity within the paths for VOQs 902 and 904, and therefore, may create an upper bound for each VOQ to avoid exceeding the capacity of the segment 907. Each VOQ (VOQs 902 and 904) would like to transmit 30 Gbps. However, ingress device 1 transmits a queue state message (via an intermediary device to ingress device 2) indicating a queue state of VOQ 902 of non-empty, or full. Ingress device 2, likewise, may transmit a queue state message to ingress device 1 indicating that VOQ 904 has a queue state of non-empty or full. Thus, both ingress devices 1 and 2 may determine that there are two active VOQs which share the same resources, including path segment 907. Based on the offered traffic load of two active VOQs and a capacity of segment 907 of 18 Gbps, ingress devices 1 and 2 may adjust or decrease the transmission rate or traffic load from VOQs 902 and 904, respectively. For example, the ingress devices may adjust the transmission rate for each VOQ to a fair portion of the capacity of the shared resource, or 1/Nth of the capacity, where N maybe the total number of VOQs sharing the resource (N=2 in this example). In this example, N=2, and the capacity of the path segment is 18 Gbps. Therefore, ingress devices 1 and 2 may adjust the traffic rate from VOQs 902 and 904, respectively, to 9 Gbps each, as shown in FIG. 9A.

FIG. 9B is a diagram illustrating network devices adjusting traffic loads across a shared resource in a network switching system according to another example embodiment. In this example, ingress device 1 includes a VOQ 902 and ingress device 2 includes VOQ 904. In this case, VOQ 902 is associated with destination 1, while VOQ 904 is associated with destination 2. However, the paths from VOQ 902 to destination 1 and from VOQ 904 to destination 2 may share one or more resources, such as intermediary device (e.g., switch fabric device, buffered cross bar switch, shared memory switch or other device) 920, segment 922 and intermediary device 924.

With reference to FIG. 9B, ingress devices 1 and 2 may exchange queue state messages so that each ingress device may obtain or determine a total offered traffic load for segment 922, which is a resource shared by both VOQs 902 and 904. Both VOQs 902 and 904 would like to transmit at a data rate of 30 Gbps each, for example (or at other rates that collectively may exceed the capacity of segment 922). However, segment 922 has a traffic capacity of 20 Gbps, which is shared by both VOQs 902 and 904. Therefore, for example, based on the known capacity of segment 922 (e.g., determined from path rate messages or from path and bandwidth database 506), and based on the number of active VOQs that share segment 922 (two active VOQs in this case), ingress device 1 and 2 may each adjust an offered traffic load for VOQ 902 and 904, respectively, such that the total offered traffic load from all ingress devices or from all VOQs in the network switching system that share the resource (segment 922 in this example) does not exceed the capacity of segment 922.

For example, referring to FIG. 9B, ingress devices 1 and 2 may adjust a traffic rate of VOQs 902 and 904, respectively, up to a fair portion or ½ of the traffic capacity of segment 922. In this example, ingress device 1 may adjust the transmission rate or traffic load from VOQ 902 to approximately (or up to) 10 Gbps, and ingress device 2 may adjust the transmission rate or traffic load from VOQ 904 to approximately (or up to) 10 Gbps. Thus, the total offered traffic load from the VOQs that share this resource (path segment 922) will typically not exceed the capacity of segment 922.

In the absence of an exchange of queue state information between ingress devices, the total offered traffic load from VOQ 902 and VOQ 904 may exceed the capacity of segment 922 (or other resource), since each ingress device may not know of the traffic load offered by other network devices. However, according to an example embodiment, by each network device determining an overall or total offered traffic load and/or number of active VOQs that share a resource, the network devices may adjust their traffic load or transmission rate to better accommodate or better match a capacity of a resource (e.g., less congestion). In some cases, transmission rates from VOQs may be adjusted such that the total offered traffic load does not exceed the capacity of the shared resource (path segment 922 in this example), according to an example implementation. In this manner, network congestion may be avoided, or at least decreased.

In a network switching system with multiple ports, congestion may be a possibility. Congestion may occur in communications systems when the offered load of network traffic may exceed the processing or forwarding capacity of the affected element. For example, port speed mismatches (fast ports forwarding to slow ports) and oversubscription (multiple ports forwarding to a single port of lesser total bandwidth) may cause congestion. Buffers, such as VOQs, may be used to absorb the excess traffic upstream of the congestion point. Buffers, FIFOs or other structured are of finite size and may, eventually, be overrun by bursts of congestion if those bursts are sufficiently long or frequent.

To prevent congestion, according to an example embodiment, each source of traffic may be able to modulate or adjust the rate at which it offers traffic to egress devices, such as switch fabric devices, so that the total amount of traffic addressed to each fabric egress port does not exceed the capacity of those ports. When the ports on ingress devices reside on multiple discrete devices, then the management of the congestion may involve the communication of congestion-related information between the affected network devices within the network switching system.

According to an example embodiment, in-band control messages, such as queue state messages 810, path state messages 820, and path rate messages 830 may be passed between the ingress devices 1 and 2 (FIGS. 9A and 9B) to convey the state of the VOQs 902 and 904. For example, an empty state, a full state, an intermediate state, or a more precise representation of the capacity of the VOQ and how many packets, cells, requested traffic rate, traffic priority (or traffic class) for each queue, or other data associated with the VOQ may be shared between the ingress devices 1 and 2. In this manner, one or more (or even all) of the ingress devices and/or one or more of VOQs 902 and 904 in the network switching system may develop a global or aggregate view of the states of the other VOQs and/or their forwarding requirements. Once the aggregate state of all of the VOQs in the network switching system is known, the various network devices of the system may know the demand on the switch fabric or the stacking interconnection, path segments or other resources. The system and/or each network device may also know where the congestion points are (e.g., based on a traffic capacity of each resource or segment) and how much more data the VOQs 902 and 904 in the ingress devices 1 and 2 can hold.

In an example embodiment, data (in the form of packets or cells), for example, may be sent on the same lines or paths as the in-band control messages 810, 820, 830. This information may be used to adjust the VOQ read rates (also known as the data transmission rates from VOQs) so that the total traffic load from any path-sharing set of VOQs, as in FIGS. 9A, 9B) does not exceed the capacity of any segment of that path, according to an example embodiment.

In multicast scenarios, each of the VOQs 902, 904 may require the use of several paths. These paths may also be used by unicast queues (VOQs) and by other multicast VOQs. Therefore, the rate adjustments of the individual queue may take these combinations into account so that none of the paths become oversubscribed, for example.

Depending on the in-band control messages 810, 820 and 830, the VOQ state information may cause the ingress devices to adjust their behavior or allocation to the egress device or destination. For example, the information may be used independently by each ingress device to adjust its VOQs' shaper settings (data transmission rates) so that congestion may be avoided or at least decreased.

There may be more than 2 ingress devices, but in the current example, each of the ingress devices 1 and 2 may set their capacity to 50% of the capacity of the shared segment or resource, for example. Likewise, if there were four ingress devices (e.g., one VOQ per ingress device) to a single egress device, the VOQ transmission rate may be scaled for each of the four VOQs may be scaled back to 25% of the traffic capacity of the shared segment.

This per-ingress-device awareness of the global queue state may be combined with a map of the various paths (or path segments) through the network switching system and the capacity of those segments such that each ingress device is able to determine the total requested (or offered) load on each path segment or resource. This requested (or total offered) traffic load may then be compared to each segment's capacity and each ingress device may make an independent determination of the fraction of the available capacity that it may be going to claim for itself. The allocation algorithms may ensure that the sum of the individual allocations will never exceed the capacity of the slowest shared path. Thus, congestion may be avoided.

The available traffic capacity of a segment or resource may be allocated to multiple VOQs using a variety of different techniques or algorithms. The capacity of a resource may be allocated using a fair allocation or fair apportionment, e.g., 1/Nth of the capacity for each of the N VOQs that use the shared resource. Non-equal allocations may be used as well, e.g., based on traffic priorities. The allocation of a shared resource in a network switching system may be based upon the traffic priority or traffic class of the cells or packets waiting for transmission. For example, traffic (e.g., packets or cells) in each VOQ may have a traffic priority or traffic class. Or, a VOQ may have a traffic priority associated with it. For example, an ingress device may include two VOQs associated with a destination (or using a shared resource), including a high priority VOQ and a low priority (e.g., best efforts) VOQ. The ingress device may allocate more (or even all) of the resource (e.g., larger percentage of available bit rate of shared segment) to the high priority VOQ. This may also be performed between ingress devices, where queue state messages indicate queue state as well as priority information of queue traffic. A VOQ having higher priority traffic may be allocated a higher portion of the capacity or bit rate of the shared segment or resource. Therefore, according to an example embodiment, a disproportionate amount of the traffic capacity of a resource may be allocated or available to high priority traffic, as compared to lower priority traffic. For example, all high priority VOQs (e.g., across multiple ingress devices) may share fairly the available capacity of the shared resource. If there is only one high priority VOQ, that VOQ may claim or use all of the capacity or a higher percentage of the capacity than the lower priority traffic VOQs, for example. These are just a few additional examples of how capacity may be shared or allocated among multiple traffic sources (e.g., VOQs).

According to an example embodiment, a network switching system may be provided. The network switching system may include a plurality of ingress devices. One or more of the ingress devices may include a plurality of ports and a plurality of traffic queues (such as VOQs) to store traffic to be transmitted via one or more shared resources to an egress device of the network switching system. One or more of the ingress devices may be configured to exchange (e.g., transmit and receive) traffic queue state information with one or more other ingress devices within the network switching system. One or more of the ingress devices may also be configured to adjust a transmitted traffic load from one or more of the traffic queues (or VOQs) based on the queue state information received from other ingress devices.

In an example embodiment, each ingress device may also operate as an egress device within the network switching system, depending on the direction of travel of a particular packet or cell. Thus, each ingress device or egress device may be referred to simply as a network device. The ingress devices and egress devices may be directly coupled together, or may be coupled together via one or more intermediary devices, such as switch fabric devices, buffered crossbar switches, shared memory switches or other devices, for example.

In an example embodiment, one or more of the ingress devices may be configured to determine a total offered traffic load for a shared resource within the network switching system. The total offered traffic load may include, for example, a sum of offered traffic loads from one or more sources (e.g., active VOQs) of the network switching system. The device may also determine a capacity of the shared resource, and adjust a transmission rate from one or more of the active traffic queues over the shared resource such that the total offered traffic load from the active traffic queues does not exceed the capacity of the shared resource.

In another example embodiment, the network device may be configured to exchange queue state messages with other network devices of the network switching system to allow the network device to determine active and not-active VOQs. Each VOQ may be associated with a destination, and a path from an ingress device to an egress device of the network switching system may include one or more resources shared among the VOQs.

In another example embodiment, a device being configured to determine a capacity of a shared resource may include the network device being configured to determine a destination associated with a VOQ, determine resources for a path between an ingress device and a destination for each VOQ, determine a resource that is shared among a plurality of the VOQs, and determine a traffic capacity of the shared resource.

Also, in another embodiment, one or more ingress devices being configured to adjust a transmission rate may include the device being configured to adjust a transmission rate from each of the VOQs that use the shared resource to be approximately 1/Nth of the capacity of the shared resource based on N active VOQs offering traffic load over the shared resource. The shared resource may include a path segment between a VOQ and a destination of the network switching system, the destination may include one of an egress network device, an egress port, or a virtual port on an egress network device.

According to another example embodiment, a network switching system may include a plurality of network devices, each network device including a plurality of virtual output queues (VOQs) for storing traffic to be forwarded to a destination. The network switching system may include one or more intermediary devices coupled between the network devices. One or more of the ingress devices may be configured to receive queue state messages indicating a state of the VOQs of one or more of the other network devices of the network switching system. One or more of the network devices may be configured to adjust a transmission rate from its VOQs based on the received queue state information received from one or more other network (or ingress) devices.

Figure 10:
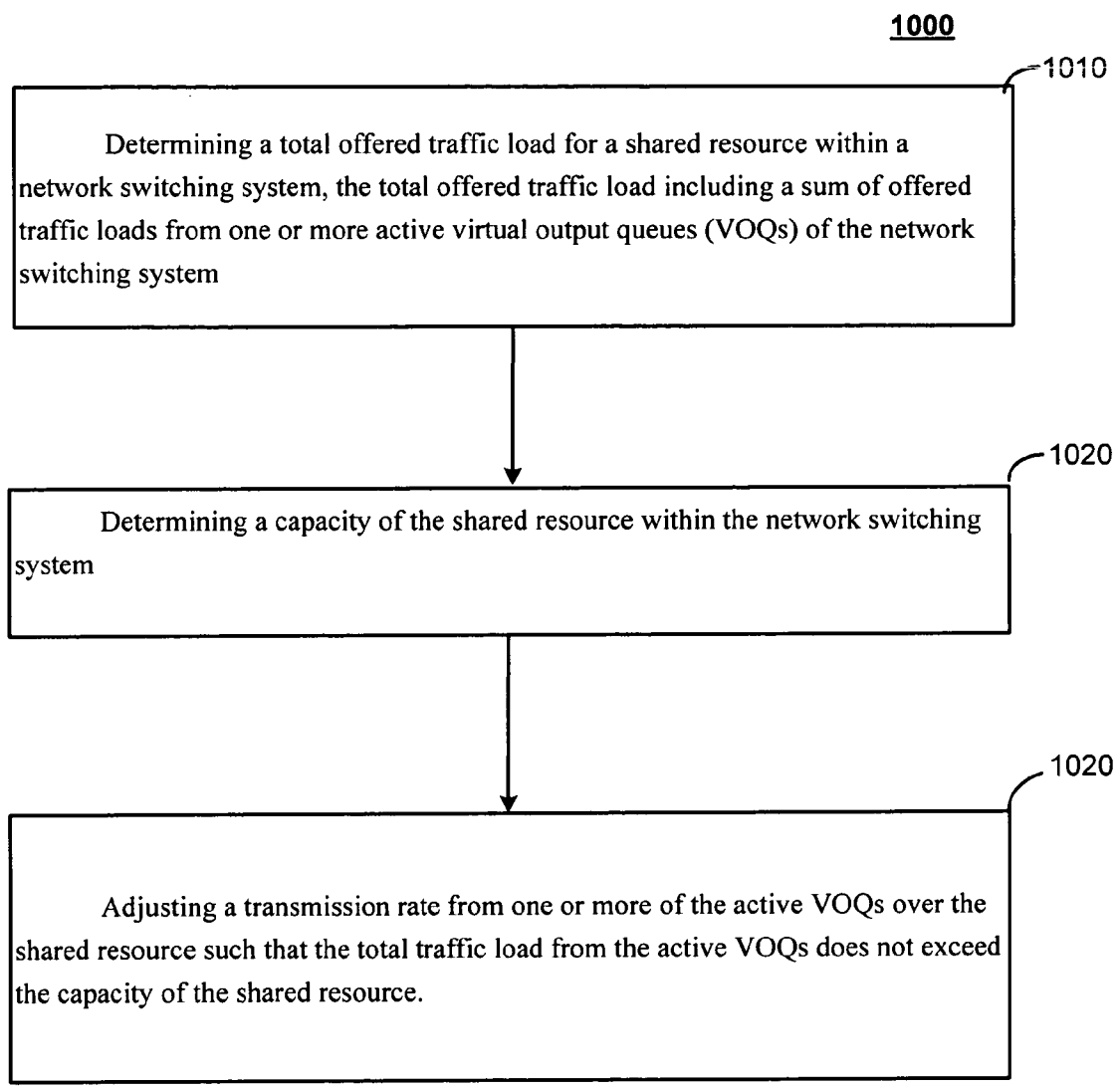
FIG. 10 is a flow chart illustrating operation according to an example embodiment.

FIG. 10 is a flow chart illustrating operation according to an example embodiment. At 1010, a total offered traffic load may be determined for a shared resource within a network switching system, the total offered traffic load including a sum of offered traffic loads from one or more active virtual output queues (VOQs) of the network switching system.

For example, operation 1010 may include each of a plurality of ingress devices of the network switching system reporting a state of one or more of its VOQs such that one or more ingress devices of the network switching system obtains a global view of a demand (or offered traffic load) upon one or more shared resources of the network switching system. For example, queue state messages (e.g., indicating empty/non-empty state or a level of fullness) may be exchanged between network devices of the network switching system to allow one or more network devices of the system to determine a state (e.g., active or non-empty) of one or more VOQs. Each of the VOQs may be associated with a destination, and a path from an ingress device to an egress device may include one or more resources that may be shared among VOQs of the network switching system.

At 1020, a capacity of the shared resource may be determined within the network switching system. For example, operation 1020 may include one or more of the following: determining a destination associated with each VOQ, determining resources for a path between an ingress device and a destination for each VOQ, determining a resource that is shared among a plurality of the VOQs, and determining a bit rate or traffic capacity of the shared resource.

At 1030, a transmission rate from one or more of the active VOQs over the shared resource may be adjusted such that the total traffic load from the active VOQs does not exceed the capacity of the shared resource. For example, operation 1030 may include adjusting a transmission rate from each (or one or more) of the VOQs that use the shared resource to be approximately a fair share (e.g., 1/Nth) of the capacity of the shared resource based on a number of active VOQs offering traffic load over the shared resource and the capacity of the shared resource.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various example embodiments.

What is claimed is:

1. A network switching system comprising:
   a plurality of ingress devices, each of the ingress devices including a plurality of ports and a plurality of traffic queues to store traffic to be transmitted via one or more shared resources to an egress device of the network switching system;
   one or more of the ingress devices configured to exchange traffic queue state information with one or more other ingress devices within the network switching system, one or more of the ingress devices also configured to adjust a transmitted traffic load from one or more of the traffic queues based on the queue state information received from other ingress devices.
   wherein one or more of the ingress devices are configured to:
   determine a total offered traffic load for a shared resource within the network switching system, the total offered traffic load including a sum of offered traffic loads from one or more active traffic queues of the network switching system;
   determine a capacity of the shared resource within the network switching system; and
   adjust a transmission rate from one or more of the active traffic queues over the shared resource such that the total traffic load from the active traffic queues does not exceed the capacity of the shared resource.

2. The network switching system of claim 1 wherein each ingress device operates as an ingress device and an egress device, depending on a direction of traffic transmission.

3. The network switching system of claim 1 wherein the traffic queues comprise virtual output queues.

4. The network switching system of claim 1 and further comprising one or more intermediary devices coupled between the ingress and egress devices, where each ingress or egress device may operate as an ingress device or an egress device depending on traffic direction.

5. The network switching system of claim 4 wherein the intermediary devices comprise one or more of a switch fabric device, a shared memory switch and/or a cross bar switch.

6. The network switching system of claim 1 wherein each of the traffic queues comprises a virtual output queue (VOQ), and wherein one or more of the ingress devices being configured to determine a total offered traffic load comprises one or more of the ingress devices being configured to:
   exchange queue state messages between network devices of the network switching system to allow one or more of the network devices to determine active and non-active VOQs, each VOQ associated with a destination, and wherein a path from an ingress network device to an egress network device within the network switching system includes one or more resources or segments that may be shared among the VOQs.

7. The network switching system of claim 1 wherein each of the traffic queues comprises a virtual output queue (VOQ), and wherein one or more of the ingress devices being configured to determine a capacity of the shared resource comprises one or more of the ingress devices being configured to:
   determine a destination associated with each VOQ;
   determine resources for a path between an ingress device and a destination for each VOQ;
   determine a resource that is shared among a plurality of the VOQs; and
   determine a traffic capacity of the shared resource.

8. The network switching system of claim 1 wherein each of the traffic queues comprises a virtual output queue (VOQ), and wherein one or more of the ingress devices being configured to adjust a transmission rate comprises one or more of the ingress devices being configured to:
   adjust a transmission rate from each the VOQs that use the shared resource to be approximately 1/Nth of the capacity of the shared resource based on N active VOQs offering traffic load over the shared resource, the shared resource including a path segment between a VOQ and a destination of the network switching system, the destination including one of an egress network device, an egress port, or a virtual port on an egress network device.

9. A network switching system comprising:
   a plurality of network devices;
   each network device including a plurality of virtual output queues (VOQs) for storing traffic to be forwarded to a destination;
   at least one intermediary device coupled between the network devices;
   one or more of the ingress devices being configured to receive queue state messages indicating a state of the VOQs of one or more of the other network devices of the network switching system; and
   wherein one or more of the network devices being configured to:
   determine a total offered traffic load for a shared resource within the network switching system, the total offered traffic load including a sum of offered traffic loads from one or more active traffic queues of the network switching system; determine a capacity of the shared resource within the network switching system; and adjust a transmission rate from one or more of the active traffic queues over the shared resource such that the total traffic load from the active traffic queues does not exceed the capacity of the shared resource.

10. A method comprising:
    determining a total offered traffic load for a shared resource within a network switching system, the total offered traffic load including a sum of offered traffic loads from one or more active virtual output queues (VOQs) of the network switching system;

determining a capacity of the shared resource within the network switching system;

adjusting a transmission rate from one or more of the active VOQs over the shared resource such that the total traffic load from the active VOQs does not exceed the capacity of the shared resource.

11. The method of claim 10 wherein the determining a total offered traffic load comprises:

each of a plurality of ingress devices of the network switching system reporting a state of one or more of its VOQs such that one or more ingress devices of the network switching system obtains a global view of a demand or total offered traffic load upon one or more shared resources of the network switching system.

12. The method of claim 11 wherein the ingress devices reporting states of one or more of its VOQs comprises an ingress device sending a queue state message indicating an empty/non-empty status for one or more VOQs.

13. The method of claim 11 wherein the ingress devices reporting states of one or more of its VOQs comprises an ingress device sending a queue state message indicating a level of fullness for one or more VOQs.

14. The method of claim 10 wherein the determining a total offered traffic load comprises:

exchanging queue state messages between network devices of the network switching system to allow one or more of the network devices to determine active and non-active virtual output queues (VOQs), each VOQ associated with a destination, and wherein a path from an ingress network device to an egress network device within the network switching system includes one or more resources or segments that may be shared among the VOQs.

15. The method of claim 10 wherein the determining a capacity of the shared resource within a network switching system comprises:

determining a destination associated with each VOQ;

determining resources for a path between an ingress device and a destination for each VOQ;

determining a resource that is shared among a plurality of the VOQs; and determining a bit rate capacity of the shared resource.

16. The method of claim 10 wherein the adjusting comprises:

adjusting a transmission rate from each of the VOQs that use the shared resource to be approximately a fair share of the capacity of the shared resource based on a number of active VOQs offering traffic load over the shared resource and the capacity of the shared resource, the shared resource including a path segment within a switch fabric of the network switching system.

17. The method of claim 10 wherein the adjusting comprises: adjusting a transmission rate from each the VOQs to provide an uneven or weighted allocation of bandwidth among the VOQs.

18. A network switching system comprising:

a plurality of network devices;

each network device including a plurality of virtual output queues (VOQs) for storing traffic to be forwarded to a destination via a shared resource;

the network switching system configured to:

determine a total offered traffic load for the shared resource, the total offered traffic load including a sum of offered traffic loads from one or more active virtual output queues (VOQs) of the network switching system;

determine a capacity of the shared resource; and adjust a transmission rate from one or more of the active VOQs over the shared resource such that the total traffic load from the active VOQs does not exceed the capacity of the shared resource.

19. The network switching system of claim 18 wherein the network switching system includes the shared resource.

20. The network switching system of claim 19 wherein one or more of the network devices of the network switching system are configured to exchange queue state messages with one or more other network devices of the network switching system to allow one or more of the network devices to determine active and non-active VOQs, each VOQ associated with a destination, and wherein a path from an ingress network device to an egress network device within the network switching system includes the shared resource.

21. The network switching system of claim 20 wherein one or more of the ingress devices are configured to:

adjust a transmission rate from each the VOQs that use the shared resource to be approximately $1/N^{th}$ of the capacity of the shared resource based on N active VOQs offering traffic load over the shared resource, the shared resource including a path segment between a VOQ and a destination of the network switching system, the destination including one of an egress network device, an egress port, or a virtual port on an egress network device.

* * * * *

UNITED STATES PATENT AND TRADEMARK OFFICE
CERTIFICATE OF CORRECTION

| | | |
|---|---|---|
| PATENT NO. | : 7,733,781 B2 | Page 1 of 1 |
| APPLICATION NO. | : 11/639651 | |
| DATED | : June 8, 2010 | |
| INVENTOR(S) | : Brian A. Petersen | |

It is certified that error appears in the above-identified patent and that said Letters Patent is hereby corrected as shown below:

In column 23, line 43, in claim 1, delete "devices." and insert -- devices; and --, therefor.

Signed and Sealed this
Twenty-eighth Day of December, 2010

David J. Kappos
*Director of the United States Patent and Trademark Office*